(12) United States Patent
Peters

(10) Patent No.: US 10,722,967 B2
(45) Date of Patent: Jul. 28, 2020

(54) APPARATUS AND METHOD FOR WELDING WITH AC WAVEFORM

(71) Applicant: LINCOLN GLOBAL INC, City of Industry, CA (US)

(72) Inventor: Steven R Peters, Huntsburg, OH (US)

(73) Assignee: LINCOLN GLOBAL, INC., City of Industry, CA (US)

(*) Notice: Subject to any disclaimer, the term of this patent is extended or adjusted under 35 U.S.C. 154(b) by 493 days.

(21) Appl. No.: 15/418,640

(22) Filed: Jan. 27, 2017

(65) Prior Publication Data

US 2018/0214966 A1  Aug. 2, 2018

(51) Int. Cl.
B23K 9/073 (2006.01)
B23K 9/173 (2006.01)
B23K 9/09 (2006.01)

(52) U.S. Cl.
CPC ............ *B23K 9/073* (2013.01); *B23K 9/092* (2013.01); *B23K 9/173* (2013.01)

(58) Field of Classification Search
CPC .......... B23K 9/09; B23K 9/091; B23K 9/092; B23K 9/093; B23K 9/06; B23K 9/073; B23K 9/0734; B23K 9/1012
USPC ............ 219/121.45, 121.57, 130.21, 130.31, 219/130.32, 130.33, 130.4, 130.5, 130.51, 219/136, 137 PS
See application file for complete search history.

(56) References Cited

U.S. PATENT DOCUMENTS

| | | |
|---|---|---|
| 3,657,724 A | 4/1972 | Feeley |
| 3,775,585 A | 11/1973 | Okada |
| 3,809,653 A | 5/1974 | Manz |
| 4,544,826 A | 10/1985 | Nakanishi |
| 4,954,691 A | 9/1990 | Parks |
| 4,972,064 A | 11/1990 | Stava |
| 5,001,326 A | 3/1991 | Stava |
| 5,003,154 A | 3/1991 | Parks |
| 5,148,001 A | 9/1992 | Stava |
| 6,034,350 A | 3/2000 | Heraly |
| 6,040,555 A | 3/2000 | Tiller |
| 6,051,810 A | 4/2000 | Stava |
| 6,103,994 A | 8/2000 | DeCoster |
| 6,156,999 A | 12/2000 | Ignatchenko |
| 6,215,100 B1 | 4/2001 | Stava |
| 6,384,373 B1 | 5/2002 | Schwartz |
| 6,441,342 B1 | 8/2002 | Hsu |
| 6,477,605 B1 | 11/2002 | Taki |
| 6,570,132 B1 | 5/2003 | Brunner |
| 6,624,388 B1 | 9/2003 | Blankenship |

(Continued)

FOREIGN PATENT DOCUMENTS

| | | |
|---|---|---|
| EP | 1 232 825 A2 | 8/2002 |
| EP | 1 985 400 A1 | 10/2008 |

OTHER PUBLICATIONS

Extended European Search Report from Corresponding Application No. EP18153678.0; dated Jul. 27, 2018; pp. 1-8.

(Continued)

*Primary Examiner* — Ibrahime A Abraham
*Assistant Examiner* — Justin C Dodson
(74) *Attorney, Agent, or Firm* — David J. Muzilla

(57) ABSTRACT

A welder power supply and welding method are provided which utilizes a short arc welding method in which the waveforms have a positive polarity portion and negative portion to optimize heat input and provide heat and current control.

10 Claims, 19 Drawing Sheets

(56) References Cited

U.S. PATENT DOCUMENTS

| | | |
|---|---|---|
| 6,730,875 B2 | 5/2004 | Hsu |
| 6,781,095 B2 | 8/2004 | Hayes |
| 6,833,529 B2 | 12/2004 | Ueyama |
| 7,064,290 B2 | 6/2006 | Blankenship |
| 7,180,029 B2 | 2/2007 | Ott |
| 7,217,904 B2 | 5/2007 | Blankenship |
| 7,304,269 B2 | 12/2007 | Fulmer et al. |
| 7,381,922 B2 | 6/2008 | Ulrich |
| 7,902,484 B2 | 3/2011 | Ulrich |
| 7,919,728 B2 | 4/2011 | Era |
| 8,067,714 B2 | 11/2011 | Era |
| 8,373,093 B2 | 2/2013 | Peters |
| 8,592,724 B2 | 11/2013 | Ott |
| 8,680,431 B2 | 3/2014 | Stava |
| 8,993,927 B2 | 3/2015 | Peters |
| 9,333,582 B2 | 5/2016 | Daniel |
| 9,481,046 B2 | 11/2016 | Peters |
| 9,533,366 B2 | 1/2017 | Peters |
| 9,662,736 B2 | 5/2017 | Peters |
| 2004/0074884 A1 | 4/2004 | Butler |
| 2004/0079740 A1 | 4/2004 | Myers |
| 2005/0051524 A1 | 3/2005 | Blankenship |
| 2005/0269297 A1 | 12/2005 | Buda |
| 2006/0070983 A1 | 4/2006 | Narayanan |
| 2006/0231540 A1 | 10/2006 | Stava |
| 2007/0051712 A1 | 3/2007 | Kooken |
| 2007/0056944 A1 | 3/2007 | Artelsmair |
| 2007/0164007 A1 | 7/2007 | Peters |
| 2008/0083714 A1 | 4/2008 | Kamath |
| 2009/0026188 A1 | 1/2009 | Schorghuber |
| 2011/0073569 A1 | 3/2011 | Rappl |
| 2011/0114615 A1 | 5/2011 | Daniel |
| 2011/0278273 A1 | 11/2011 | Hirota |
| 2012/0097644 A1 | 4/2012 | Ott |
| 2012/0097655 A1 | 4/2012 | Daniel |
| 2012/0097656 A1 | 4/2012 | Peters |
| 2012/0118865 A1 | 5/2012 | Stava |
| 2013/0112675 A1 | 5/2013 | Peters |
| 2013/0319988 A1 | 12/2013 | Beistle |
| 2014/0008342 A1 | 1/2014 | Peters |
| 2014/0076872 A1 | 3/2014 | Ott |
| 2014/0124491 A1 | 5/2014 | Daniel |
| 2014/0263242 A1* | 9/2014 | Peters .................... B23K 9/093 219/130.51 |
| 2015/0151376 A1 | 6/2015 | Peters |
| 2015/0283638 A1 | 10/2015 | Henry |
| 2015/0283639 A1* | 10/2015 | Henry ................ B23K 35/3053 219/130.51 |
| 2016/0082538 A1 | 3/2016 | Peters |
| 2017/0113293 A1 | 4/2017 | Henry |

OTHER PUBLICATIONS

Extended European Search Report from Corresponding Application No. EP18153687.1; dated Jul. 27, 2018; pp. 1-9.

* cited by examiner

APPARATUS AND METHOD FOR WELDING WITH AC WAVEFORM

BACKGROUND OF THE INVENTION

Field of the Invention

Devices, systems, and methods consistent with the invention relate to welding, and more specifically to devices, systems and methods for welding and clearing a short circuit.

Incorporation by Reference

The present invention generally relates to improvement in spatter and heat input in welding systems of the general type described in each of U.S. Pat. Nos. 6,215,100 and 7,304,269, the entire disclosures of which are incorporated herein by reference in their entirety.

Description of the Related Art

In electric arc welding, it is generally known that welding in an electrode negative state can result in a lower overall heat input during a welding operation. For example. It is generally known that GMAW type welding can be done with a short arc transfer waveform in an electrode negative state. However, it has been noticed that when a short circuit occurs in the electrode negative state and is cleared using a negative polarity an arc instability or spatter event can occur. That is, for example, during certain pulse periods, especially in applications where the welding electrode operates very close to the workpiece, molten metal contacts the workpiece before being entirely released from the advancing wire electrode. This creates a short circuit (a.k.a., a short) between the advancing wire electrode and the workpiece. It is desirable to eliminate or clear the short rapidly to obtain the consistency associated with proper pulse welding. However, clearing a short can result in undesirable spatter being generated. Such spatter causes inefficiencies in the welding process and can result in molten metal being spattered over the workpiece which may have to be removed later using a grinding tool, for example.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is a welding apparatus and method having or using a welding power converter which outputs any type of welding current where there is a risk of the electrode touching the plate or puddle and arc-reignition would occur in the negative polarity. The welding power converter provides the welding waveform to an electrode and at least one workpiece to weld the at least one workpiece. Also included is a short circuit detection circuit which detects a short circuit event between the electrode and the work piece, and an AC welding module which changes the polarity of the current of the DC electrode negative waveform from negative to positive after the detection of the short circuit event. After the current changes to positive the welding power converter outputs a short clearing current to clear the short circuit event and after the short circuit event is cleared, the AC welding module changes the polarity of said current from positive to negative, and without the detection of the short circuit event the current is maintained as a DC electrode negative welding waveform.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Figure 1:
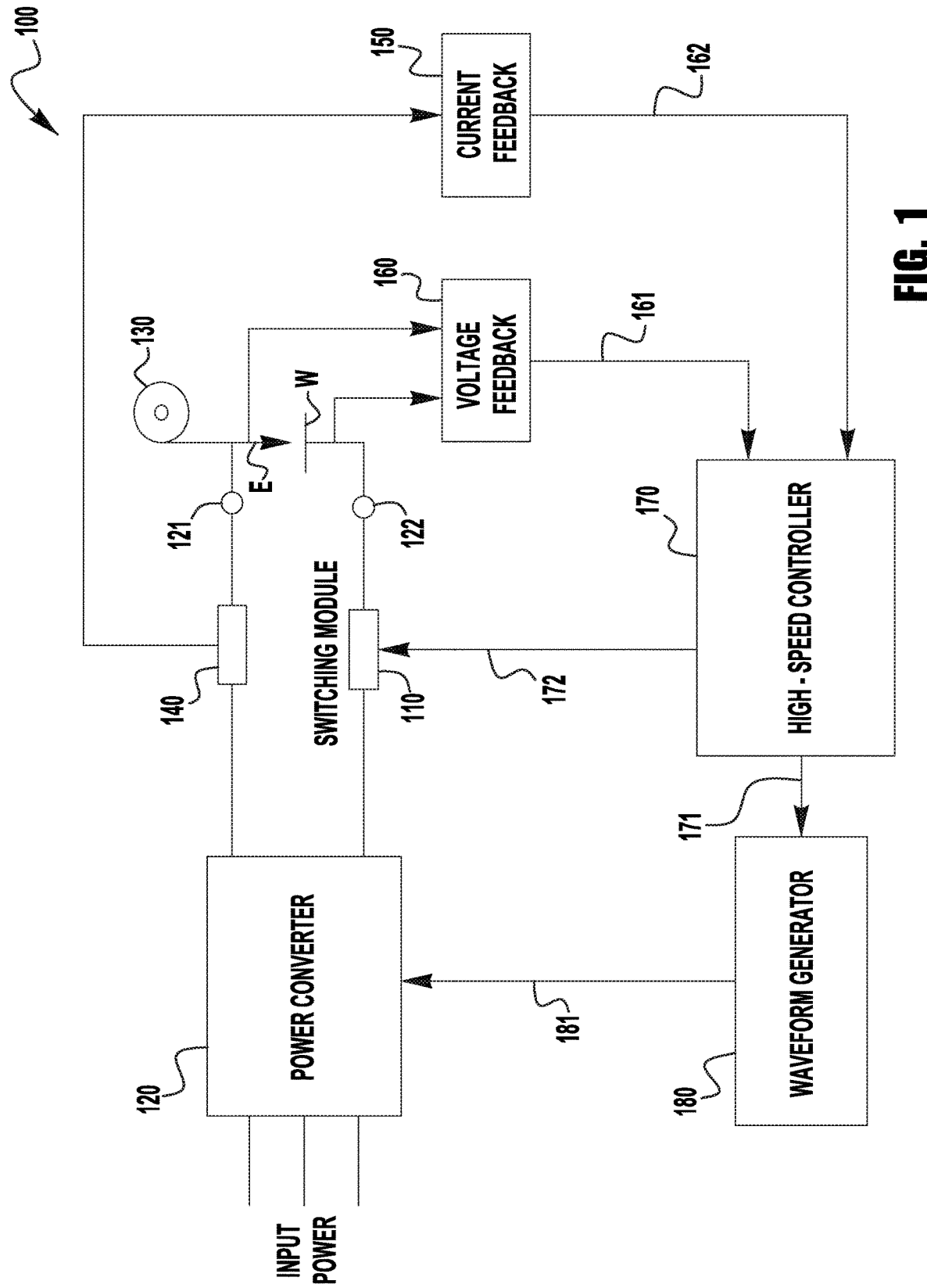
FIG. 1 illustrates a block diagram of an example embodiment of an electric arc welding system incorporating a switching module in a welding current return path.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

During an arc-welding process, when the distance between the tip of the electrode and the workpiece is relatively small, molten metal may be transferred via a contact transfer process (e.g., a surface-tension-transfer or STT process) or a free-flight transfer process (e.g., a pulsed welding process) with a tethered connection. In a contact transfer process, a molten metal ball on the tip of the welding electrode makes contact with the workpiece (i.e., shorts) and starts to "wet into" the molten puddle on the workpiece before the molten metal ball begins to substantially separate from the tip of the electrode.

Figure 6:
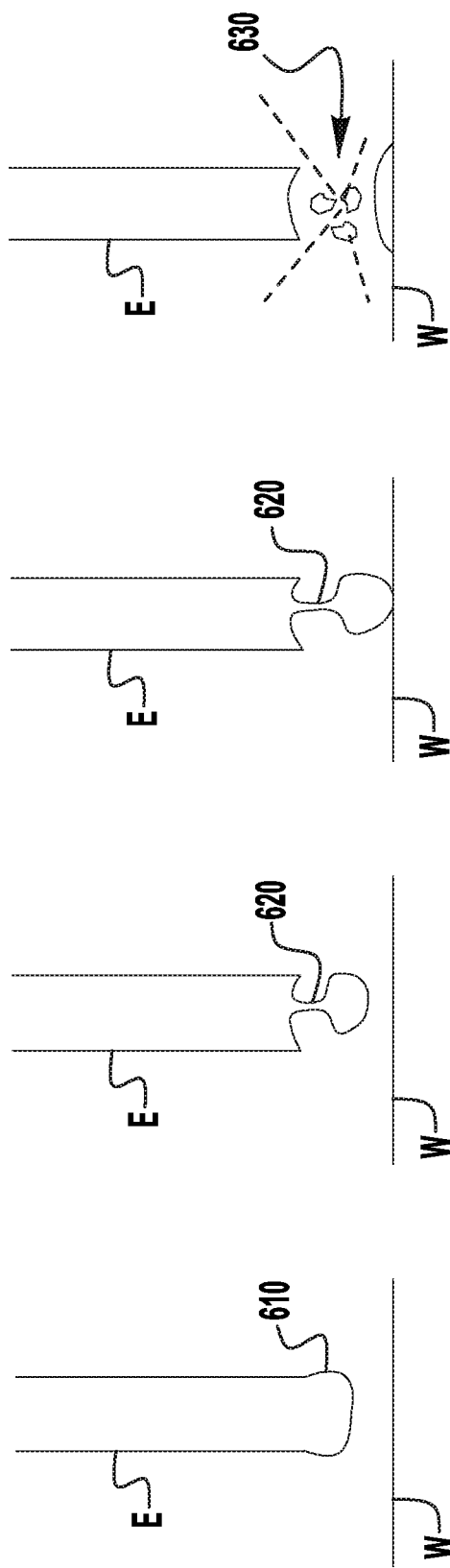
FIG. 6 illustrates the exploding spatter process discovered using high speed video technology in a free-flight transfer process having a tethered connection.

In a free-flight transfer process, the molten metal ball breaks free of the tip of the electrode and "flies" across the arc toward the workpiece. However, when the distance between the tip of the electrode and the workpiece is relatively short, the molten metal ball flying across the arc can make contact with the workpiece (i.e., short) while a thin tether of molten metal still connects the molten metal ball to the tip of the electrode. In such a tethered free-flight transfer scenario, the thin tether of molten metal tends to explode, causing spatter, when the molten metal ball makes contact with the workpiece as illustrated in FIG. 6 herein, due to a rapid increase in current through the tether. This can especially be the case when welding in a DC electrode negative (DCEN) state. Therefore, aspects of the present invention address this issue by clearing any short circuit in a positive polarity, when the welding waveform is a DCEN type waveform.

Turning now to FIG. 1, FIG. 1 illustrates a block diagram of an example embodiment of an electric arc welding system 100 incorporating a switching module 110 in a welding output return path and providing welding outputs 121 and 122. The system 100 includes a power converter 120 capable of converting an input power to a welding output power. The power converter 120 may be an inverter-type power converter or a chopper-type power converter, for example. The system 100 further includes a wire feeder 130 capable of feeding a welding electrode wire E through, for example, a welding gun (not shown) that connects the welding electrode wire E to the welding output 121. The wire feeder 130 is capable of both advancing the wire and retracting the wire quickly. That is, the wire feeder can have a controller (such as known wire feeders) that can both advance and retract the wire as commanded or desired by the welding operation. The advancement and retraction can be controlled by the controller in the welding power supply or an external controller as needed. Such systems are known and need not be described in detail herein.

The system 100 also includes a current shunt 140 (or similar device) operatively connected between the power converter 120 and the welding output 121 for feeding welding output current to a current feedback sensor 150 of the system 100 to sense the welding output current produced by the power converter 120. The system 100 further includes a voltage feedback sensor 160 operatively connected between the welding output 121 and the welding output 122 for sensing the welding output voltage produced by the power converter 120. As an alternative, the switching module 110 could be incorporated in the outgoing welding current path, for example, between the power converter 120 and the current shunt 140, or between the current shunt 140 and the welding output 121.

The system 100 also includes a high-speed controller 170 operatively connected to the current feedback sensor 150 and the voltage feedback sensor 160 to receive sensed current and voltage in the form of signals 161 and 162 being representative of the welding output. The system 100 further includes a waveform generator 180 operatively connected to the high speed controller 170 to receive command signals 171 from the high speed controller 170 that tell the waveform generator how to adapt the welding waveform signal 181 in real time. The waveform generator 180 produces an output welding waveform signal 181 and the power converter 120 is operatively connected to the waveform generator 180 to receive the output welding waveform signal 181. The power converter 120 generates a modulated welding output (e.g., voltage and current) by converting an input power to a welding output power based on the output welding waveform signal 181.

The switching module 110 is operatively connected between the power converter 120 and the welding output 122 which is connected to the welding workpiece W during operation. The high speed controller 170 is also operatively connected to the switching module 110 to provide a switching command signal (or a blanking signal) 172 to the switching module 110. The high speed controller 170 may include logic circuitry, a programmable microprocessor, and computer memory, in accordance with an embodiment of the present invention.

In accordance with an embodiment of the present invention, the high-speed controller 170 may use the sensed voltage signal 161, the sensed current signal 162, or a combination of the two to determine when a short occurs between the advancing electrode E and the workpiece W, when a short is about to clear, and when the short has actually cleared, during each pulse period. Such schemes of determining when a short occurs and when the short clears are well known in the art, and are described, for example, in U.S. Pat. No. 7,304,269, which is incorporated herein by reference in its entirety. The high-speed controller 170 may command the waveform generator 180 to modify the waveform signal 181 when the short occurs and/or when the short is cleared. For example, when a short is determined to have been cleared, the high-speed controller 170 may command the waveform generator 180 to incorporate a plasma boost pulse (see pulse 750 of FIG. 7) in the waveform signal 181 to prevent another short from occurring immediately after the clearing of the previous short.

Figure 2:
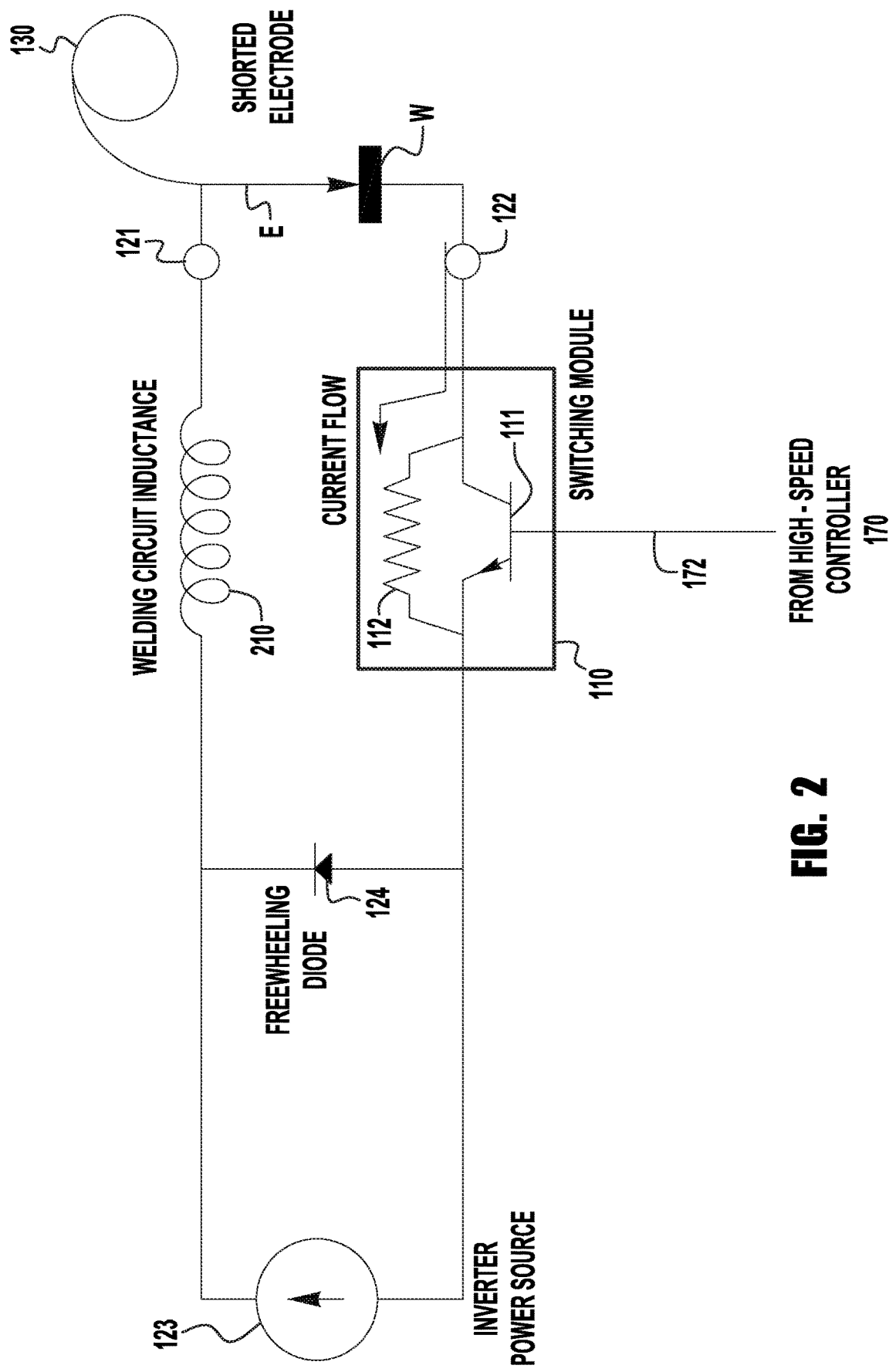
FIG. 2 illustrates a diagram of an example embodiment of a portion of the system of FIG. 1, including the switching module in the welding current return path.

FIG. 2 illustrates a diagram of an example embodiment of a portion of the system 100 of FIG. 1, including the switching module 110 in the welding current return path. The power converter 120 may include an inverter power source 123 and a freewheeling diode 124. The welding output path will have an inherent welding circuit inductance 210 due to the various electrical components within the welding output path. The switching module 110 is shown as having an electrical switch 111 (e.g., a power transistor circuit) in parallel with a resistive path 112 (e.g., a network of high power rated resistors).

During a pulse period of the welding waveform, when no short is present, the electrical switch 111 is commanded to be closed by the switching command signal 172 from the high speed controller 170. When the electrical switch 111 is closed, the electrical switch 111 provides a very low resistance path in the output welding return path, allowing welding current to freely return to the power converter 120 through the switch 111. The resistive path 112 is still present in the welding output return path, but most of the current will flow through the low resistance path provided by the closed switch 111. However, when a short is detected, the electrical switch 111 is commanded to be opened by the switching command signal 172 from the high-speed controller 170. When the electrical switch 111 is opened, current is cut off from flowing through the switch 111 and is forced to flow through the resistive path 112, resulting in the level of the current being reduced due to the resistance provided by the resistive path 112.

Figure 3:
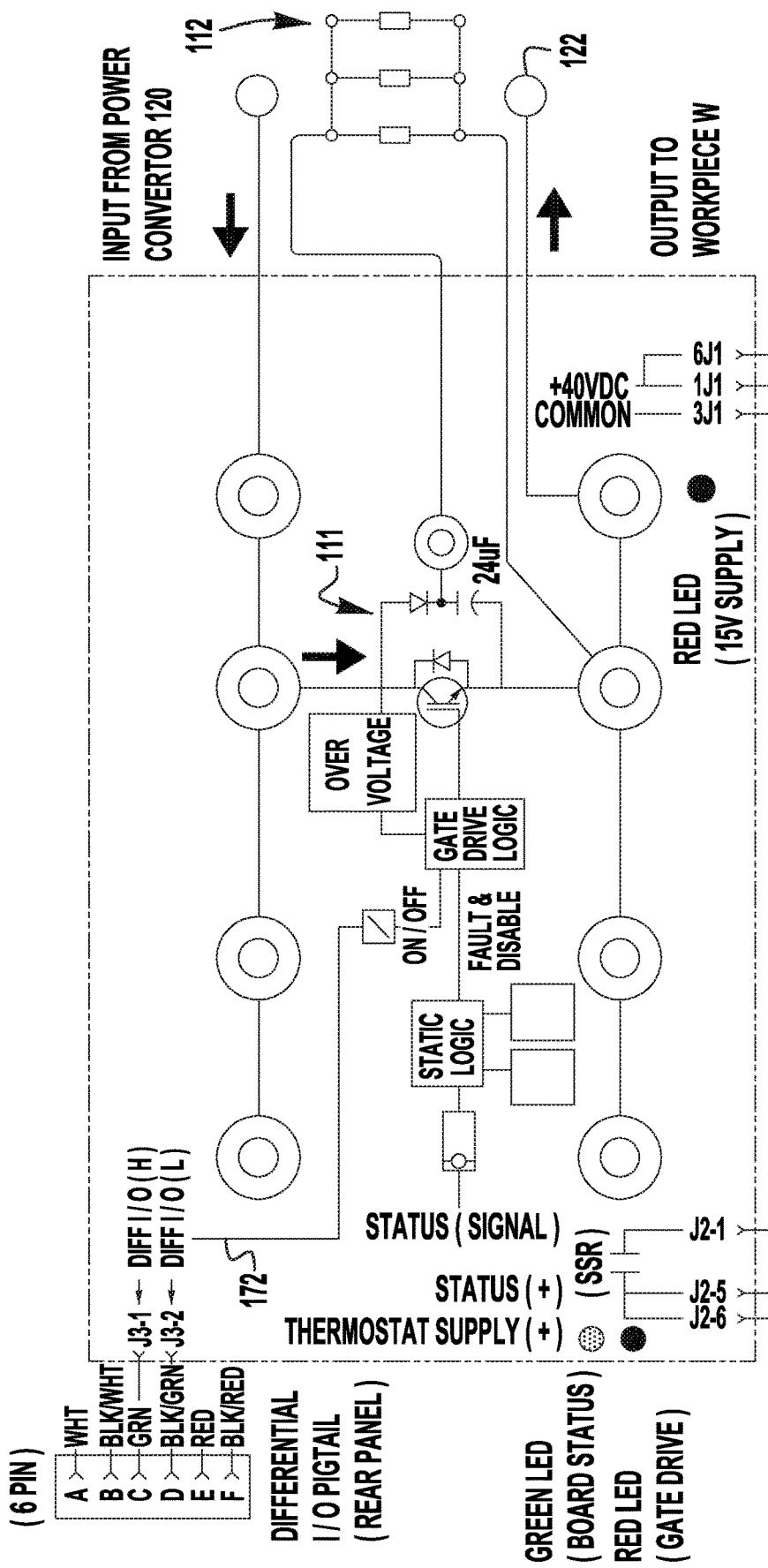
FIG. 3 illustrates a schematic diagram of an example embodiment of the switching module of FIG. 1 and FIG. 2.

FIG. 3 illustrates a schematic diagram of an example embodiment of the switching module 110 of FIG. 1 and FIG. 2. The switching module 110 includes the transistor circuit 111 and the resistor network 112 as shown. The switching module 110 may include a circuit board for mounting the various electrical components of the module 110 including the transistor circuit 111, the resistor network 112, LEDs, and status logic circuitry, for example.

Figure 4:
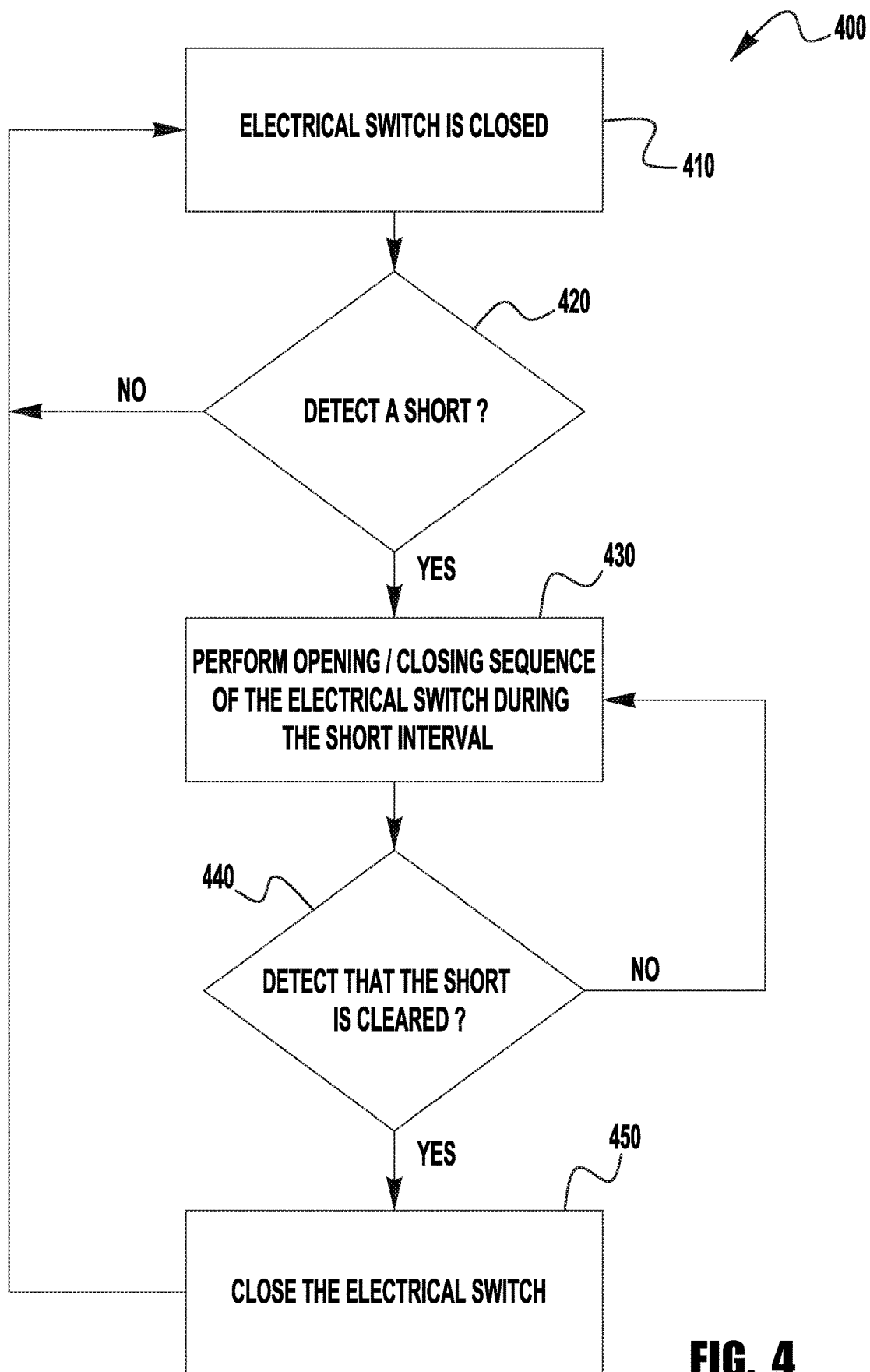
FIG. 4 illustrates a flowchart of a first example embodiment of a method for preventing spatter in an electric arc welding process using the system of FIG. 1.

FIG. 4 illustrates a flowchart of a first example embodiment of a method 400 for preventing spatter and clearing a short in a pulsed electric arc welding process using the system 100 of FIG. 1, and commonly used when the short is cleared in the same polarity as welding. Step 410 represents operation where the switch 111 of the switching module 110 is normally closed (no short condition). In step 420, if a short is not detected, then the switch 111 remains closed (no short condition). However, if a short is detected then, in step 430, the switch 111 is commanded to go through an opening and closing sequence during the short interval (i.e., the time period over which the electrode is shorted to the workpiece).

The opening/closing sequence in step 430 starts by opening the switch 111 when the short is first detected. The switch 111 remains open for a first period of time (e.g., a first 10% of the short interval). This decreases the output current quickly so the short does not break right away causing a large amount of spatter. After the first period of time, the switch is again closed and the output current is ramped during a second period of time to cause the molten short to begin to form a narrow neck in an attempt to break free from the electrode and clear the short. During this second period of time, as the current is ramping, a dv/dt detection scheme is performed to anticipate when the short will clear (i.e., when the neck will break). Such a dv/dt scheme is well known in the art. The switch 111 is then opened again just before the short is about to clear (e.g., during the last 10% of the short interval) in order to quickly lower the output current once again to prevent excessive spattering when the neck actually breaks (i.e., when the short actually clears).

In step 440, if the short (short between the electrode and the workpiece) is still present, then the switch 111 remains open. However, if the short has been cleared then, in step 450, the switch 111 is again closed. In this manner, during a short condition, the switch 111 goes through an opening/closing sequence and the current flowing through the welding output path is reduced when the switch is open, resulting in reduced spatter. The method 400 is implemented in the high-speed controller 170, in accordance with an embodiment of the present invention. Furthermore, in accordance with an embodiment of the present invention, the system 100 is able to react at a rate of 120 kHz (i.e., the switching module 110 can be switched on and off at this high rate), providing sufficient reaction to detection of a short and detection of the clearing of the short to implement the method 400 in an effective manner.

In accordance with a somewhat simpler alternative embodiment, instead of going through the opening/closing sequence described above with respect to FIG. 4, the current of the welding circuit path is decreased, in response to detection of a short between the advancing wire electrode and the workpiece, by opening the switch 111 for at least a determined period of time, thus increasing the resistance in the welding circuit path. For most pulse periods, the determined period of time is of a duration allowing for the short to clear without having to first increase the current of the welding circuit path. During a given pulse period, if the short clears before the determined period of time has expired as desired, then the process proceeds to the next part of the pulse period. However, if the short does not clear within the predetermined period of time then, immediately after the determined period of time, the switch 111 is closed again, causing the current of the welding circuit path to once again increase and clear the short. In such an alternative embodiment, the switch 111 is simply opened for at least part of the determined period of time in response to the detection of the short. In most pulse periods, the current does not have to be increased to clear the short.

Furthermore as an option, when the short between the advancing wire electrode and the workpiece is detected, a speed of the advancing wire electrode can be slowed. Slowing the speed of the advancing wire electrode helps to clear the short more readily by not adding as much material to the short as otherwise would be added. To slow the speed of the advancing wire electrode, a motor of a wire feeder advancing the wire electrode may be switched off and a brake may be applied to the motor. The brake may be a mechanical brake or an electrical brake, in accordance with various embodiments.

Figure 5:
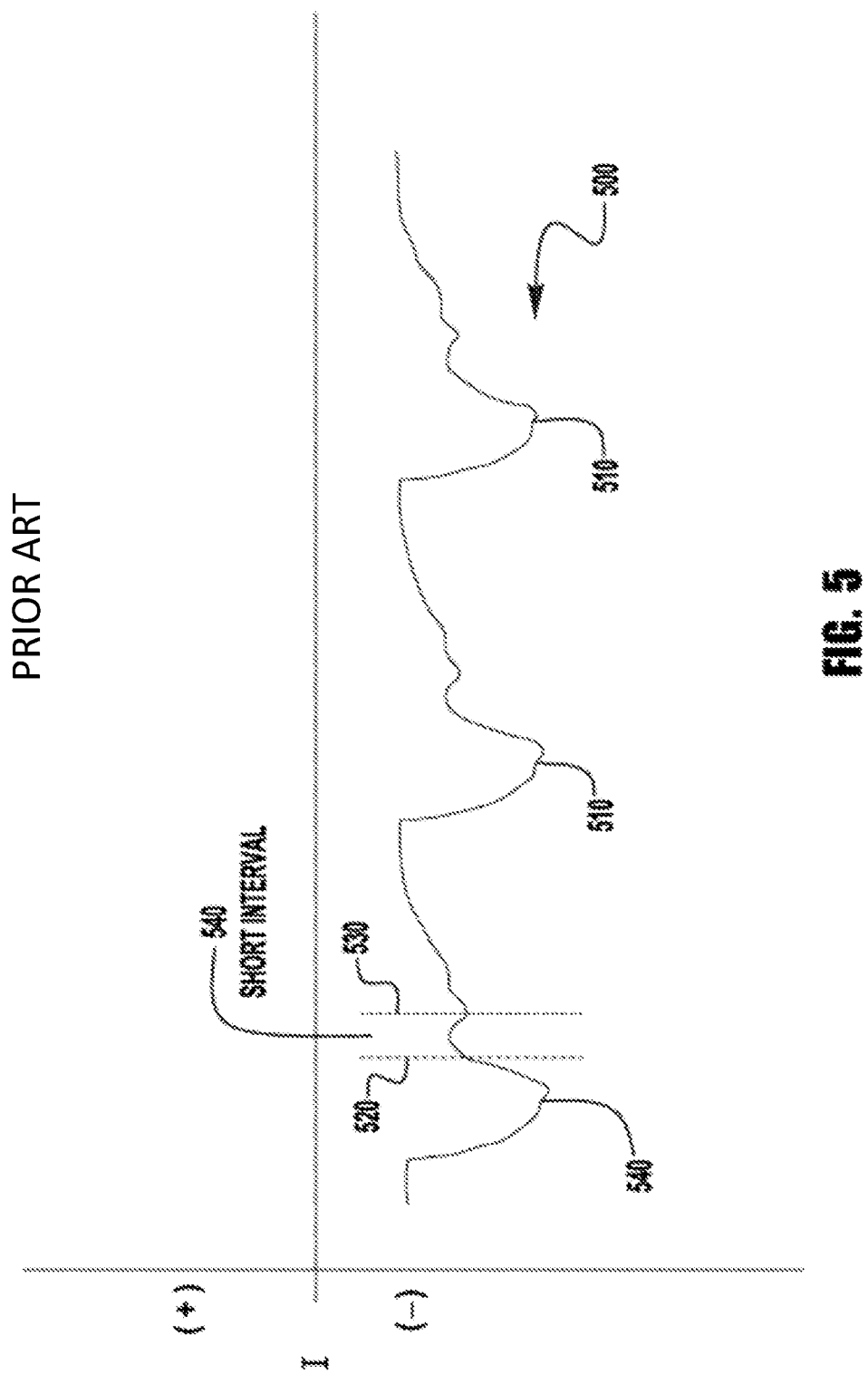
FIG. 5 illustrates an example of a conventional pulsed output current waveform resulting from a conventional electric arc welder that does not use the switching module of FIGS. 1-3 in accordance with the method of FIG. 4.

FIG. 5 illustrates an example of a conventional pulsed DCEN output current waveform 500 resulting from a conventional pulsed electric arc welder that does not use the switching module 110 of FIGS. 1-3 in accordance with the method 400 of FIG. 4, or the simpler alternative method described above, and where the short is cleared in the same polarity as the welding waveform. As can be seen from the waveform 500 of FIG. 5, after a peak pulse 510 is fired, a short may occur starting at time 520, for example, that lasts until time 530, for example when the short is cleared. The times 520 and 530 define a short interval 540. As can be seen in FIG. 5, peak pulses 510 are fired at regular intervals during the multiple pulse periods or cycles of the welding process. During any given cycle or pulse period, a short condition may or may not occur. In a conventional system, when a short occurs, there is very little resistance in the welding output path compared to the inductance. Current continues to flow even if the power source is turned off.

Referring again to FIG. 5, during the short interval 540, the output current tends to increase due to the lack of an arc between the electrode E and the workpiece W (the resistance becomes very low), and due to the fact that the welding circuit inductance 210 acts to keep current flowing in the welding output path, even when the power converter 120 is phased back to a minimum level. The current tends to increase until the short is cleared (i.e., until the molten metal short breaks free of the electrode E). However, at such increased current levels, when the short breaks or clears, the increased current levels tend to cause the molten metal to explode causing spatter.

FIG. 6 illustrates the exploding spatter process that was discovered using high speed video technology in a free-flight transfer process having a tethered connection. A high peak pulse (e.g., 510) causes a ball of molten metal 610 to push out towards the workpiece W creating a narrow tether 620 between the ball 610 and the electrode E. As the ball 610 flies toward the workpiece W across the arc, the tether 620 narrows and, eventually, a short occurs between the electrode E and the workpiece W through the tether 620. This condition tends to occur for almost every pulse period in an operation where the welding electrode operates very close to the workpiece. In particular, it was discovered that for a free-flight transfer pulse welding process, the tether 620 creates an incipient short and a large amount of current can begin to flow through the narrow tether 620. The increasing current level finally causes the relatively thin molten tether 620 to explode creating spatter 630 as shown in FIG. 6. However, by incorporating the switching module 110 and the method 400 (or the simpler alternative) as described above herein, the spatter 630 that is created can be greatly reduced.

Figure 7:
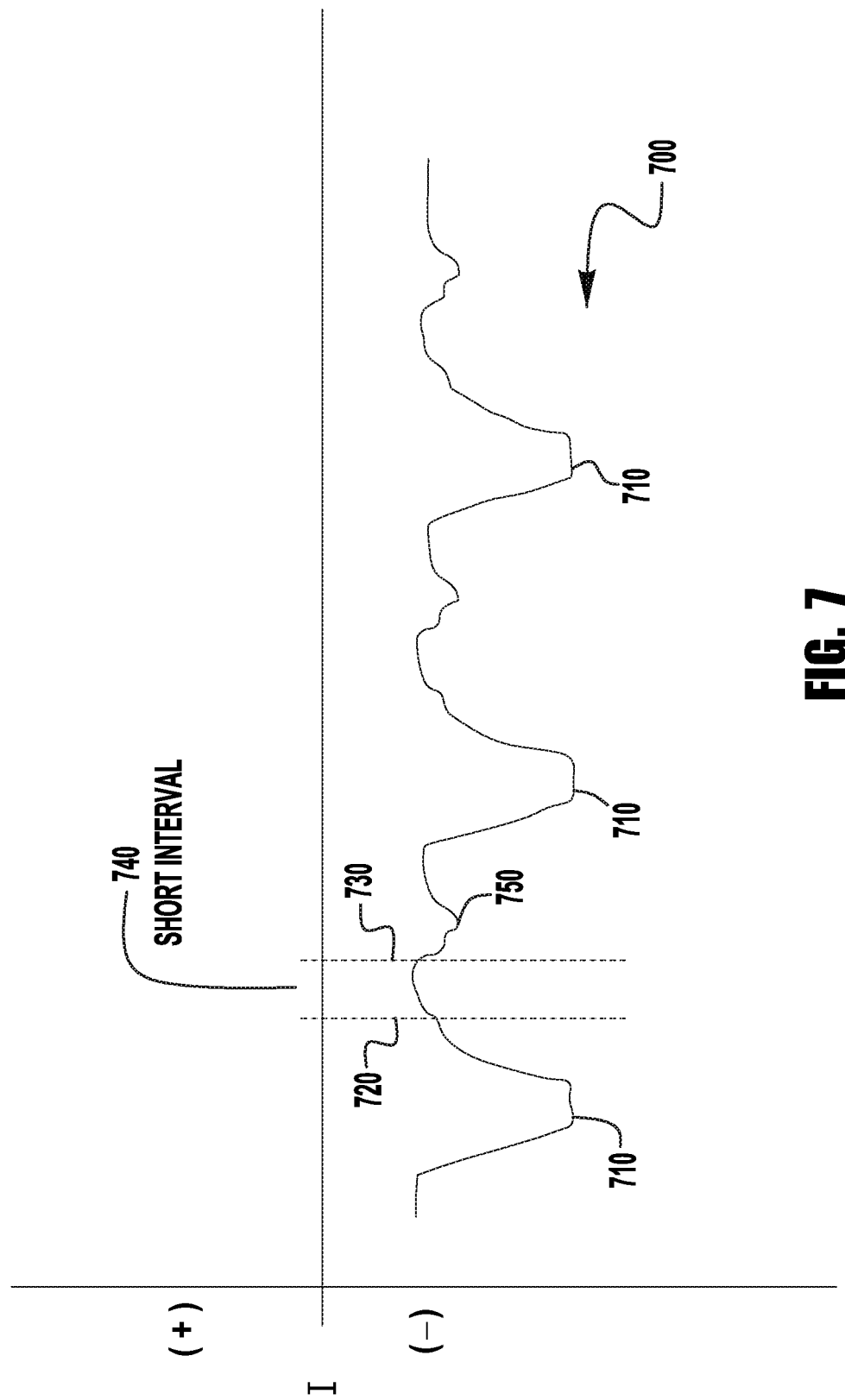
FIG. 7 illustrates an example of an output current waveform resulting from the electric arc welder of FIG. 1 that does use the switching module of FIGS. 1-3 in accordance with the method of FIG. 4.

FIG. 7 illustrates an example of a pulsed output current waveform 700 resulting from the pulsed electric arc welder 100 of FIG. 1 that uses the switching module 110 of FIGS. 1-3 in accordance with the method 400 of FIG. 4, but still where the short is cleared in the same EN polarity as the waveform 700. As can be seen from the waveform 700 of FIG. 7, after a peak pulse 710 is fired, a short may occur starting at time 720, for example, that lasts until time 730, for example when the short is cleared. The times 720 and 730 define a short interval 740. As can be seen in FIG. 7, peak pulses 710 are fired at regular intervals during the multiple pulse periods or cycles of the welding process. During any given cycle, a short condition may or may not occur. However, when the distance between the tip of the electrode and the workpiece is relatively small, a short can occur on almost every cycle.

Referring again to FIG. 7, during the short interval 740, the switch 111 of the switching module 110 is opened when the short first occurs and again when the short is about to clear, causing the output current to flow through the resistive path 112 and, therefore, causing the current level to reduce. As an example, the switching signal 172 may be a logic signal that goes from high to low when a short is detected, causing the switch to open. Similarly, when the short is cleared, the switching signal 172 may go from low to high to close the switch 111 again. When the switch 111 is opened, the resistive path 112 puts a load on the welding output path allowing the freewheeling current to drop quickly to desired levels. The current tends to reduce until the short is cleared and, at such reduced current levels, when the short breaks or clears, the molten metal tends to pinch off in an unexplosive manner, eliminating or at least reducing the amount of spatter created. Also, in the waveform 700 of FIG. 7, the plasma boost pulse 750, which is used to help prevent another short from occurring immediately after the short that was just cleared, is more prominent and potentially more effective.

Figure 8:
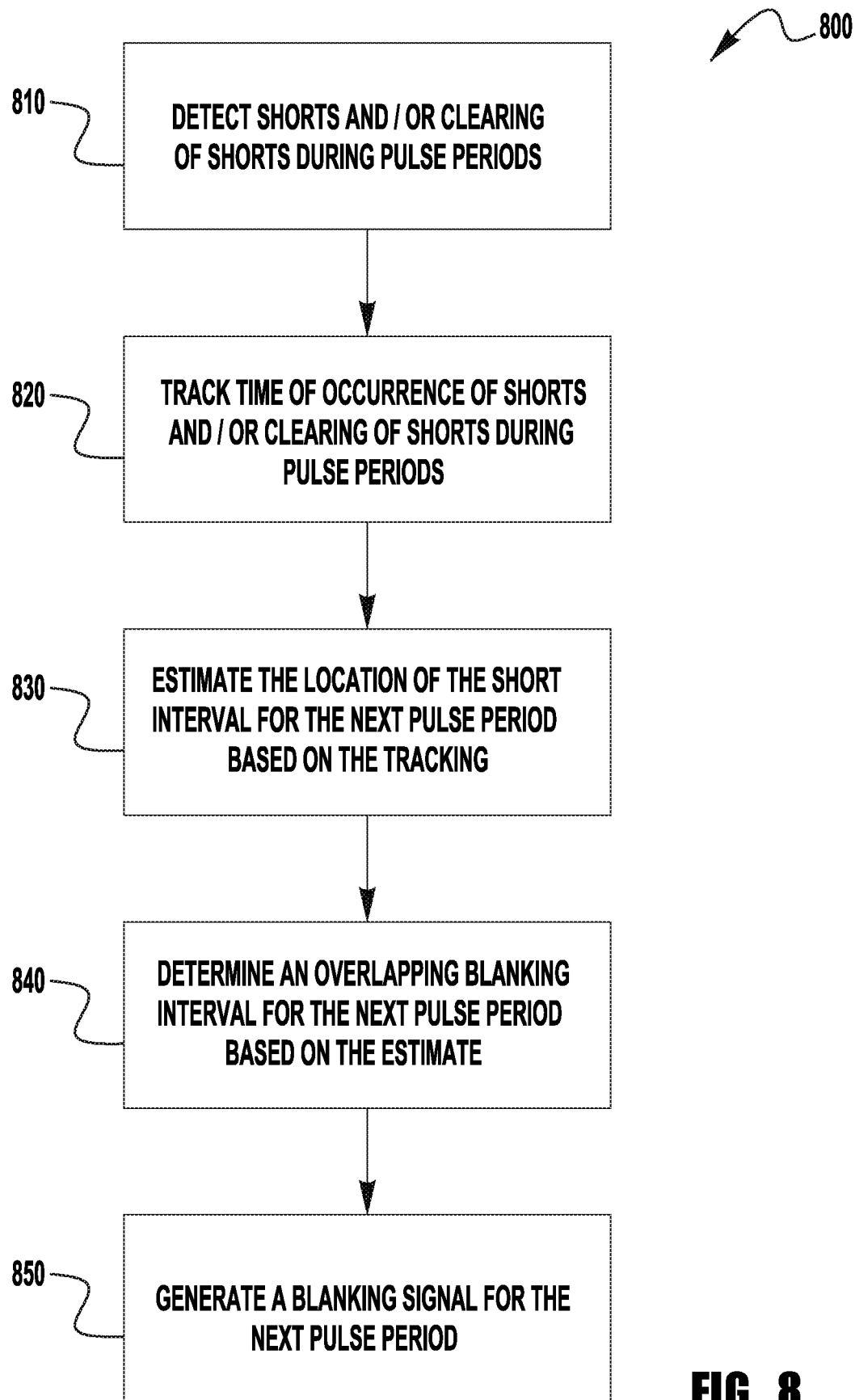
FIG. 8 illustrates a flowchart of another example embodiment of a method for preventing spatter in an electric arc welding process using the system of FIG. 1.

FIG. 8 illustrates a flowchart of another example embodiment of a method 800 for preventing spatter in a pulsed electric arc welding process using the system 100 of FIG. 1, and where the short is cleared in the same polarity. In accordance with an embodiment, the method 800 is performed by the controller 170. The high speed controller 170 tracks the times of occurrence of the shorts and/or the clearing of the shorts and provides an estimate of when the short interval 940 (the time between the occurrence of a short and when the short is cleared) (see FIG. 9) will occur during at least the next pulse period. From this estimate, a blanking interval 960 (see FIG. 9) can be determined which is used to generate the blanking signal 172.

In step 810 of the method 800, the system 100 detects the occurrence of shorts and/or the clearing of those shorts during the repeating pulse periods of the pulsed welding waveform, according to known techniques. In step 820, the time of occurrence of the detected shorts and/or clearings within the pulse periods are tracked (e.g., by the high-speed controller 170). In step 830, the location and duration of the short interval 940 (see FIG. 9) for a next pulse period is estimated based on the tracking results. In step 840, an overlapping blanking interval 960 for at least the next pulse period is determined based on the estimated location of the short interval for the next pulse period. In step 850, a blanking signal (a type of switching signal) 172 is generated (e.g., by the controller 170) to be applied to the switching module 110 during the next pulse period.

Figure 9:
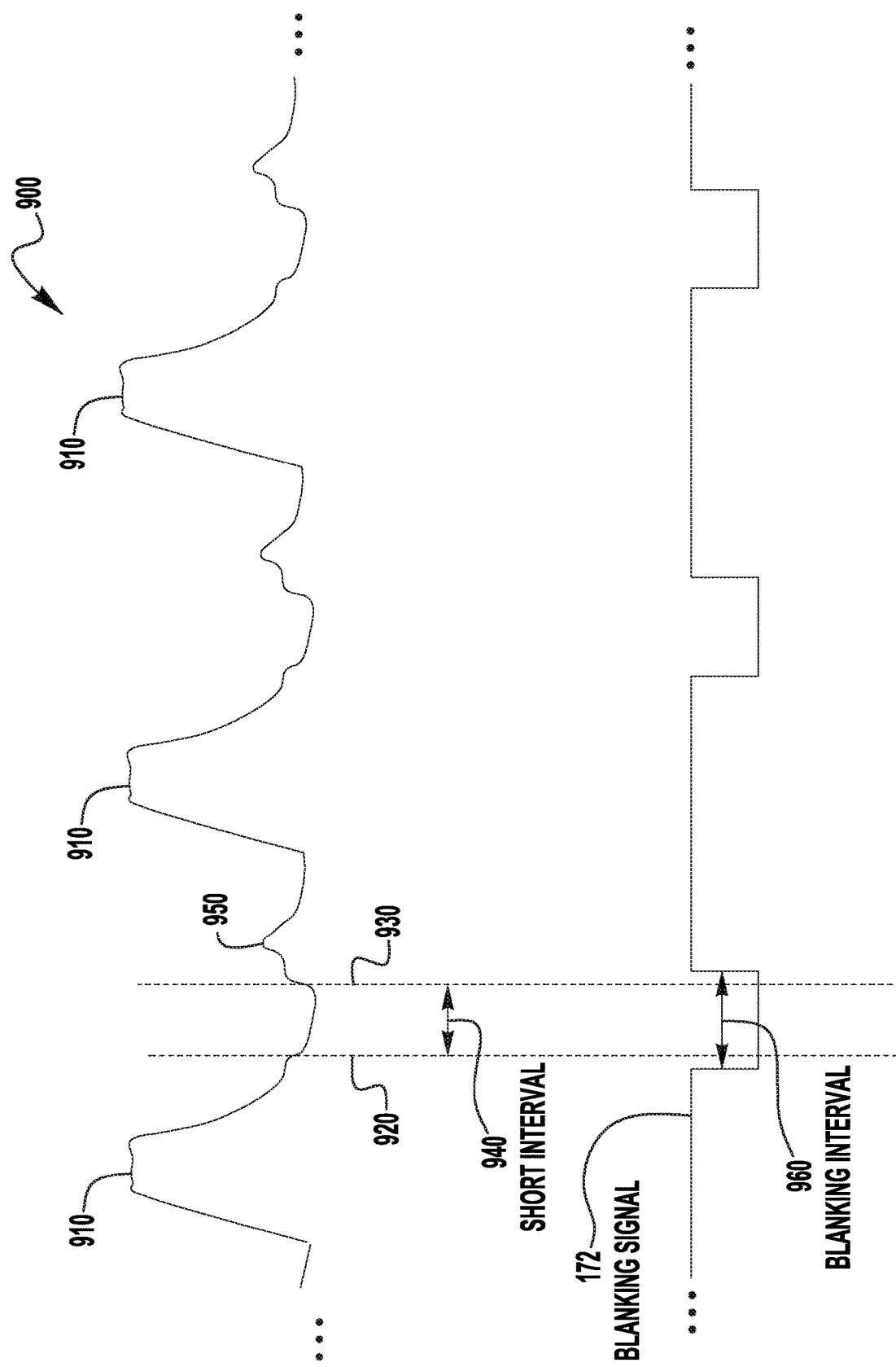
FIG. 9 illustrates an example of an output current waveform resulting from the electric arc welder of FIG. 1 that uses the switching module of FIGS. 1-3 in accordance with the method of FIG. 8.

FIG. 9 illustrates an example of a pulsed output current waveform 900 resulting from the pulsed electric arc welder 100 of FIG. 1 that uses the switching module 110 of FIGS. 1-3 in accordance with the method 800 of FIG. 8, but is shown in an electrode positive state. It is understood that although the current waveform is shown in an electrode positive state for waveform 900, the following discussion can equally apply in an electrode negative state. As can be seen from the waveform 900 of FIG. 9, after a peak pulse 910 is fired, a short may occur starting at time 920, for example, that lasts until time 930, for example when the short is cleared. The times 920 and 930 define a short interval 940. As can be seen in FIG. 9, peak pulses 910 are fired at regular intervals during the welding process. During any given cycle, a short condition may or may not occur. However, during a welding process where the arc length is relatively short (i.e., where the wire electrode is operated relatively close to the workpiece), shorts can occur in almost every pulse period.

In accordance with the method 800, the times of occurrence of the short and/or clearing of the short within the pulse period are determined and tracked from pulse period to pulse period. In this manner, the controller 170 may estimate the location of the short interval that will likely occur in the next or upcoming pulse periods. However, at the beginning of a pulsed welding process, before any substantial tracking information is available, the location of the short interval may be a stored default location based on, for example, experimental data or stored data from a previous welding process. The blanking signal 172 can be adapted or modified to form a blanking interval 960 within the blanking signal 172 which temporally overlaps the estimated short interval 940 for the next pulse period(s). Ideally, the blanking interval 960 starts shortly before the short interval 940 of the next pulse period (e.g., before the time 920) and ends shortly after the short interval 940 of the next pulse period (e.g., after the time 930), thus the temporal overlap. In one embodiment, only the times of occurrence of a short are tracked, not the clearing of the shorts. In such an embodiment, the duration of the blanking interval is set to last long enough for the short to clear, based on experimental knowledge.

In this manner, the actual occurrence of a short during the next pulse period does not have to be detected before the switch 111 of the switching module 110 can be opened. As the pulsed welding process progresses, the location of the short interval may drift or change as the distance between the wire electrode and the workpiece drifts or changes, for example. However, in this embodiment, since the location of the short interval is being tracked over time, the location of the blanking signal can be adapted to effectively follow and anticipate the short interval. By opening the switch 111 during the blanking interval 960, the current drops and it is expected that the tether will occur and break during the blanking interval 960.

Experimental results have shown that, using the switching module 110 as described herein in a particular pulsed welding scenario, the welding output current level at the point of clearing the short can be reduced from about 280 amps to about 40 amps, making a tremendous difference in the amount of spatter produced. In general, reducing the current below 50 amps seems to significantly reduce spatter. In addition, travel speeds (e.g., 60-80 inches/minute) and deposition rates are able to be maintained.

Other means and methods of reducing the welding output current level during the time period when a short is present between a welding electrode and a workpiece are possible as well. For example, in an alternative embodiment, the control topology of a welding power source may be configured to control the output current to a highly regulated level during the time of the short. The power source can control the shorting current to a lower level (e.g., below 50 amps) during a shorting interval to reduce the spatter. For example, referring to FIG. 1, the switching module 110 can be disabled or eliminated, allowing current to freely flow in the welding output circuit path. The controller 170 is configured to command the waveform generator 180 to modify a portion of the output welding waveform signal 181 of the welding process during the blanking interval to reduce the welding output current through the welding output circuit path. Therefore, in this alternative embodiment, the controller 170 reduces the current during the blanking interval through the waveform generator 180 and the power converter 120, instead of via the switching module 110. Such an alternative embodiment can work quite well if the inductance 210 of the welding circuit is sufficiently low.

In summary, an electric arc welder and a method for performing a pulse welding process producing reduced spatter are disclosed. The welder produces a current between an advancing electrode and a workpiece. The welder includes a short-detecting capability for detecting a short condition upon occurrence of a short circuit between the advancing electrode and the workpiece. The welder is controlled to reduce the current between the advancing electrode and the workpiece during the time of the short to reduce spatter of molten metal when the short clears.

An embodiment of the present invention comprises a method for reducing spatter in a pulsed arc-welding process. The method includes tracking times of occurrence of short intervals during pulse periods of a pulsed arc-welding process using a controller of a welding system. The tracking may be based on at least one of detecting occurrences of shorts during pulse periods of the pulsed welding process and detecting clearing of shorts during pulse periods of the pulsed welding process. The method further includes estimating a temporal location of a short interval for at least a next pulse period of the pulse welding process based on the tracking. The method also includes determining a blanking interval for at least a next pulse period based on the estimating. The method may further include generating a blanking signal for at least a next pulse period based on the blanking interval. The method may further include increasing a resistance of a welding circuit path of the welding system during the blanking interval in response to the blanking signal to reduce a welding current through the welding circuit path during the blanking interval. Increasing the resistance may include opening an electrical switch of a switching module disposed in the welding circuit path. In accordance with an embodiment, the electrical switch is in parallel with a resistive path within the switching module. The method may include reducing a welding current through a welding circuit path of the welding system during the blanking interval for at least a next pulse period by modifying a portion of a waveform of the welding process during the blanking interval, wherein the waveform is generated by a waveform generator of the welding system. In accordance with an embodiment, the blanking interval is temporally wider than and temporally overlaps an expected short interval of at least a next pulsed period.

An embodiment of the present invention comprises a system for reducing spatter in a pulsed arc-welding process. The system includes a controller configured for tracking times of occurrence of short intervals during pulse periods of a pulsed arc-welding process of a welding system. The controller is further configured for estimating a temporal location of a short interval for at least a next pulse period of the pulsed welding process based on the tracking. The controller is also configured for determining a blanking interval for at least a next pulse period based on the estimating. The controller may also be configured for generating a blanking signal for at least a next pulse period based on the blanking interval. In accordance with an embodiment, the blanking interval is temporally wider than and temporally overlaps an expected short interval of at least a next pulse period. The system may further include a switching module disposed in a welding circuit path of the welding system and operatively connected to the controller. The switching module is configured to increase a resistance of the welding circuit path of the welding system during the blanking interval in response to the blanking signal to reduce a welding current through the welding circuit path during the blanking interval. The switching module includes an electrical switch and a resistive path in parallel. The controller may be configured for commanding a waveform generator of the welding system to reduce a welding current through a welding circuit path of the welding system during the blanking interval for at least a next pulse period by modifying a portion of a waveform of the welding process during the blanking interval. The controller may further be configured to detect occurrences of shorts during pulse periods of the pulsed welding process, and to detect occurrences of clearing of shorts during pulse periods of the pulsed welding process.

An embodiment of the present invention comprises a method for reducing spatter in a pulsed arc-welding process. The method includes detecting a short during a pulse period of a pulsed arc-welding process using a controller of a welding system. The method further includes increasing a resistance of a welding circuit path of the welding system for a first period of time to reduce a welding current through the welding circuit path in response to detecting the short. The method also includes decreasing the resistance of the welding circuit path of the welding system for a second period of time immediately after the first period of time to increase the welding current through the welding circuit path. The method further includes increasing the resistance of the welding circuit path of the welding system for a third period of time immediately after the second period of time to reduce the welding current through the welding circuit path in anticipation of clearing the short. Increasing the resistance may include opening an electrical switch of a switching module disposed in the welding circuit path. Decreasing the resistance may include closing an electrical switch of a switching module disposed in the welding circuit path. The method may further include detecting that a short has cleared, and decreasing the resistance of the welding circuit path of the welding system in response to detecting that the short has cleared.

An embodiment of the present invention comprises a method for reducing spatter in a pulsed arc-welding process. The method includes detecting a short between a workpiece and an advancing wire electrode during a pulse period of a pulsed arc-welding process using a controller of a welding system. The method further includes decreasing a current of a welding circuit path of the welding system for at least a portion of a determined period of time in response to detecting the short wherein, during most pulse periods of the pulsed arc-welding process, the determined period of time is of a duration allowing for the short to clear without having to first increase the current of the welding circuit path. Decreasing the current may include increasing a resistance of the welding circuit path. Increasing the resistance may include opening an electrical switch of a switching module disposed in the welding circuit path, wherein the switching module includes the electrical switch in parallel with a resistance path. The method may further include increasing the current of the welding circuit path of the welding system immediately after the determined period of time if the short has not cleared. Increasing the current may include decreasing a resistance of the welding circuit path. Decreasing the resistance may include closing an electrical switch of a switching module disposed in the welding circuit path, wherein the switching module includes the electrical switch in parallel with a resistance path. The method may further include slowing down a speed of the advancing wire electrode in response to detecting the short between the electrode and the workpiece. Slowing down the speed of the advancing wire electrode may include switching off a motor of a wire feeder advancing the wire electrode and applying a brake to the motor. The brake may be a mechanical brake or an electrical brake, in accordance with various embodiments.

It is noted that although the above discussion is generally related to clearing short circuit in the same polarity as the welding waveform, whether it be DCEN or DCEP, the similar logic and control methodology can be used in embodiments of the present invention, where the welding waveform is a DCEN waveform but the short circuits are cleared in a EP state. This will be further described below relative to FIGS. 10-12.

Figure 10:
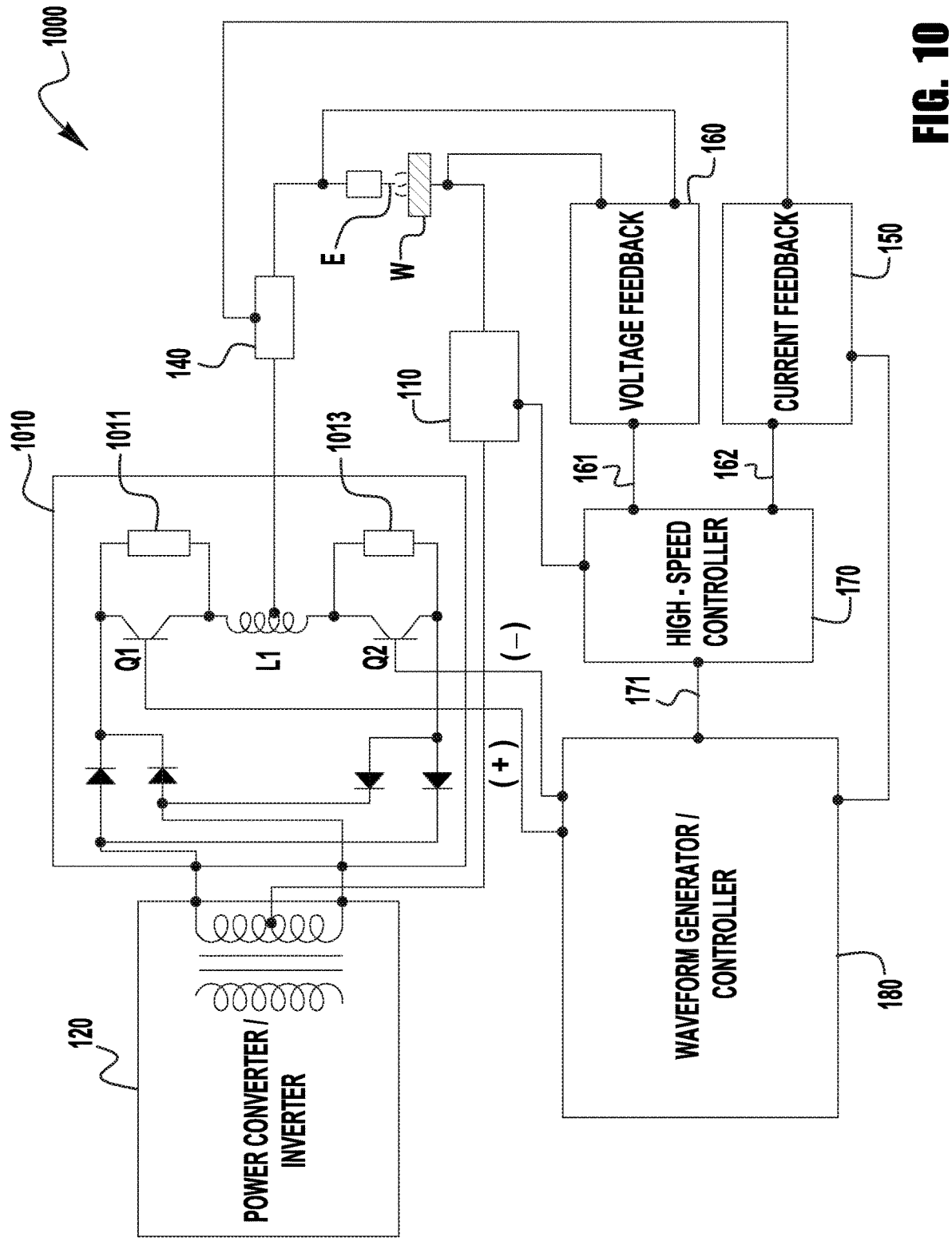
FIG. 10 illustrates an example of an additional welding system in accordance with an additional exemplary embodiment of the present invention which is capable of performing AC welding and capable of switching current from negative to positive in accordance with an embodiment of the present invention.
Figure 11:
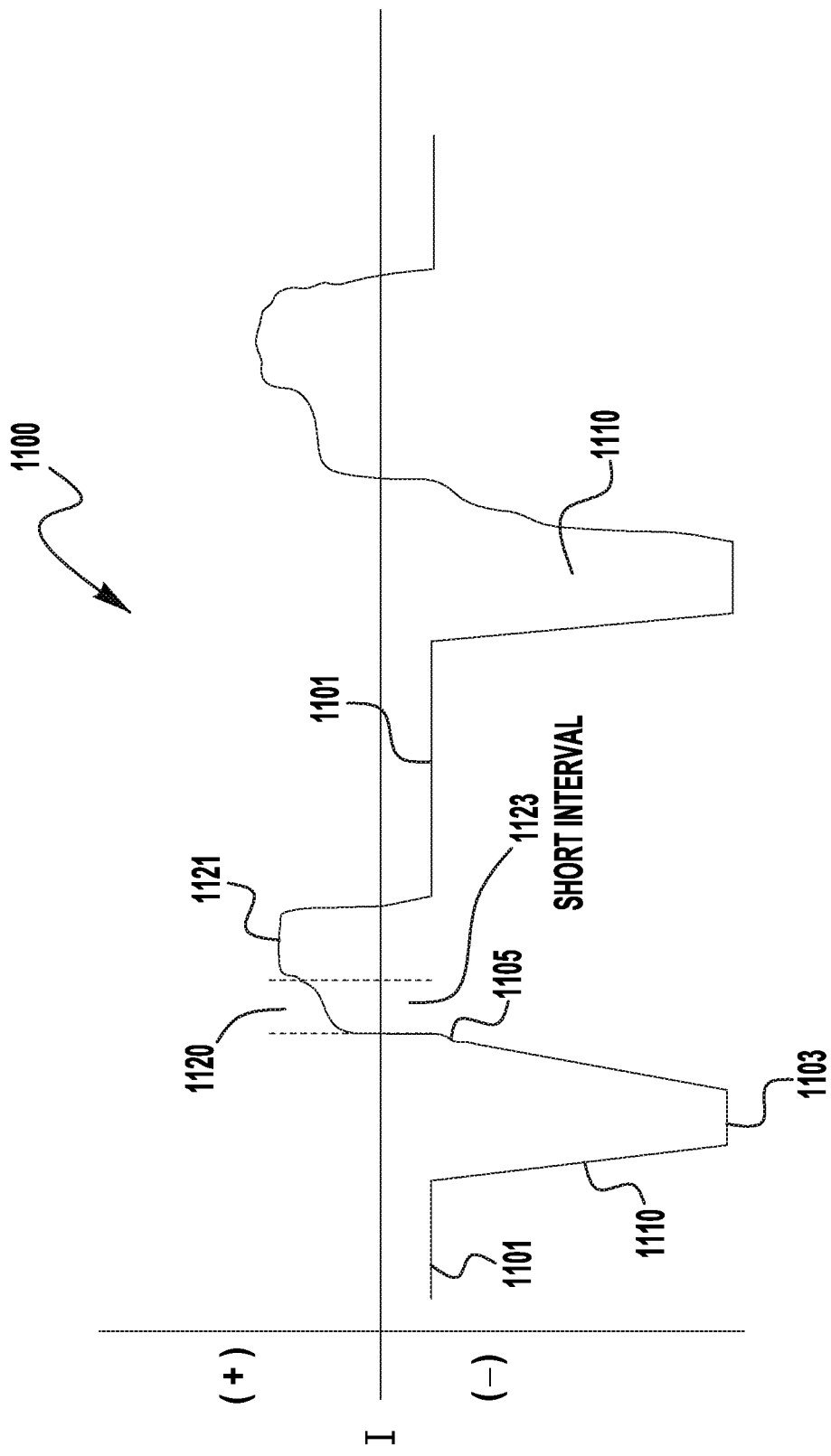
FIG. 11 illustrates an example of a welding waveform which can be generated by the system in FIG. 10.
Figure 12:
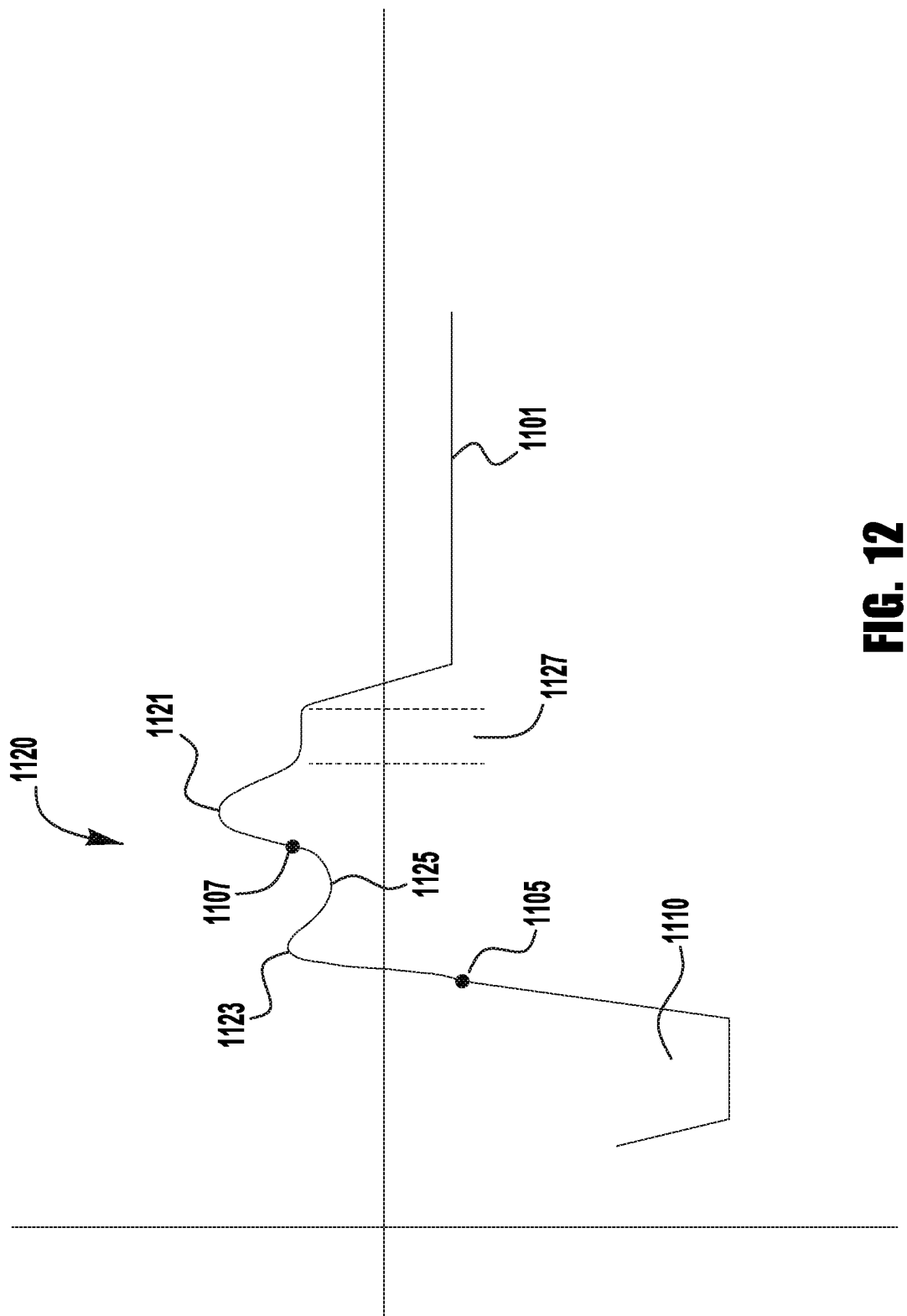
FIG. 12 illustrates an example of a short clearing portion of a waveform in accordance with an exemplary embodiment of the present invention.

FIGS. 10-12 depict a further apparatus and method for pulse welding to achieve improved performance, spatter control and heat input. Specifically, the embodiments shown in FIGS. 10-12 utilize a DCEN welding waveform, where the short circuits are cleared in an EP state, which will be described in more detail below.

FIG. 10 depicts an exemplary embodiment of a welding system 1000 which is similar in construction and operation of the systems 100 described herein in that the system 1000 is capable of using pulse welding (including the embodiments discussed herein) to weld a workpiece W. The system 1000 has similar components as discussed above including the waveform generator 180, power converter/inverter 120, shunt 140, switching module 110, high speed controller 170, voltage feedback 160, current feedback 150, etc. However, this exemplary embodiment also utilizes an AC welding module 1010. The module 1010 is constructed and configured to be able to provide an AC welding signal to the workpiece during welding, or at least change the polarity of the welding signal when desired, such as during short circuit events. In the system 1000 shown in FIG. 10 the module 1010 is shown as a separate component from the power converter/inverter 120 and can, in fact, be a separate module which is coupled to a power supply external to a housing of the power converter/inverter 120. However, in other exemplary embodiments the module 1010 can be made integral with the power converter/inverter 120 such that they are within a single housing. As with the embodiments described above, the power converter/inverter 120 can be any type of known power supply module used for welding applications which is capable of output a welding signal, and as shown can include at least one transformer. The configuration of the AC welding module 1010 as shown in FIG. 10 is intended to be exemplary and embodiments of the present invention are not limited to using the shown configuration, but other circuits can be used to provide an AC welding signal as described below. The module 1010 shown in FIG. 10 is similar in construction to the AC welding circuit described in U.S. Pat. No. 6,215,100 which is incorporated herein by reference in its entirety, and more specifically as described in relation to FIG. 4 of the incorporated patent. Because the operation and construction of this circuit is discussed in detail in the incorporated patent that discussion will not be repeated herein, as it is incorporated by reference. However, for the sake of clarity the waveform generator/controller 180 as shown in FIG. 10 can embody the controller 220 shown in FIG. 4 of the U.S. Pat. No. 6,215,100 patent. Furthermore, even though the high-speed controller 170 is shown as a separate module than the controller 180, in other embodiments the high-speed controller 170 can be made integral with the controller 180. Also, as shown in FIG. 10, in some embodiments the current feedback 150 can be coupled directly to the controller 180 so that this feedback can be used by the controller 180 for the control of the module 1010, as generally described in the U.S. Pat. No. 6,215,100 patent.

In some exemplary embodiments of the present invention, the switching module 110 may not be present in embodiments utilizing an AC module 1010. This because the switches Q1 and Q2 can be utilized in a similar fashion as the switching module 110 described above. That is the switches Q1 and/or Q2 can be controlled in a similar way, during a constant polarity portion of the waveform, such that the switching module 110 is not utilized.

As shown in FIG. 10, the module 1010 has two switches Q1 and Q2 which are used to control current flow through the inductor L1 such that the flow of current through the electrode E and work piece W can be controlled in such a way that the polarity of the signal can be reversed during welding. Specifically, the flow of current can be controlled by the switches Q1 and Q2 such that the electrode E is positive during some of the welding waveform and then switched to being negative for the remainder of the waveform. When the switch Q1 is closed and the switch Q2 is open the current flow is such that the electrode E has a positive polarity, and when the switch Q2 is closed and the switch Q1 is open the electrode E has a negative polarity. The snubbers 1011 and 1013 are used in a similar fashion to the resister 112 described above, and can be used to implement an STT type circuit control.

Other AC welding power supplies and AC welding circuits can be employed without departing from the spirit and scope of the present invention.

As shown in FIGS. 5, 7 and 9 of the present application, pulse welding can be performed when the entire weld form has one polarity (typically positive). This means that the current flow in a single direction throughout the welding process. As explained earlier, when welding in one polarity it may be advantageous to clear a short circuit in the opposite polarity. This is especially true when the welding waveform is a DCEN waveform and a short circuit event occurs. It has been discovered that there are advantages to clearing the short circuit in an electrode positive mode.

FIG. 11 depicts a current waveform 1100 in accordance with an exemplary embodiment of the present invention. As can be seen the waveform 1100 is primarily a DCEN waveform. The waveform shown in this example is an exemplary pulse welding waveform, but any other type of DCEN welding waveform can be employed, including but not limited to a surface tension transfer (STT), or any other waveform that can weld in a DCEN mode. This waveform is shown for exemplary purposes.

The waveform 1100 has a background current level 1101 and a plurality of pulses 1110 each having a peak current level 1103. As shown, after the pulses 1110 a shorting event occurs 1105 in which a short circuit condition occurs (or is about to occur) between the electrode and the workpiece. In embodiments of the present invention, when the short circuit event occurs, or is detected, the power supply (for example, as described in FIG. 10) switches polarity from DCEN to EP before the short clearing function is implemented. Thus, as shown, at the short circuit event the polarity of the waveform 1100 switches from EN to EP such that the short interval 1123 occurs when the waveform is in the EP state. Once in the EP state, the power supply can clear the short using any known short clearing pulse 1120 or function. For example, a standard short circuit clearing function can be utilized. Alternatively, as shown in FIG. 11 a boost pulse or plasma boost pulse 1121 can be implemented after the short has cleared to provide further burn back of the electrode, as desired. The use of a boost pulse or plasma boost pulse after clearing a short is known and need not be described in detail herein.

Once the short clearing pulse 1120 or function has been completed in the EP state, the power supply switches polarity of the waveform 1100 from EP to EN and the DCEN waveform 1100 resumes. For example, as shown the background current 1101 is reached and held until the next pulse 1110 is triggered. The switching of the current polarity can be accomplished by the system shown in FIG. 10, for example. Of course, other power supplies capable of welding in an AC mode can be utilized to implement embodiments of the invention.

As explained previously, it has been discovered that sometimes when a short is cleared in an EN state this can cause excessive spatter. This can be due to the jet forces pushing up on the electrode as the short clears in EN. It has been determined that clearing a short in a EP state results in a more stable clearing of the short as well as less spatter.

Aspects of the present invention can be implemented in different ways, which will be briefly described below. That is, in some exemplary embodiments the change from negative to positive polarity can occur at or after the short circuit occurs (physical contact between the electrode and the puddle) or it can occur before the actual short circuit occurs. In the first example, the power supply detects the short circuit by monitoring the voltage and/or current. Such monitoring and detection is generally known. When the short circuit is detected the power supply switches polarity of the current and drives the current in an EP state until such time the short is cleared and the welding arc is re-established. When the arc is re-established the power supply switches polarity again to return to the DCEN waveform 1100. In the other exemplary embodiments, the power supply can use a premonition circuit (generally known) which can monitor dv/dt for example, and when a short circuit event is determined to be occurring imminently the power supply can switch polarity of the waveform 1100 from EN to EP to clear the short circuit. For purposes of the present application the detection of a short circuit event includes the detection of an actual short circuit state or the determination of an imminent short circuit event through the use of a premonition circuit (or the like). Thus, embodiments of the present invention can use either detection of a short circuit event to trigger the switch of polarity.

As explained above, the short clearing in the EP state can be done in any number of ways so long as the short is cleared before the waveform 1100 returns to the EN state. FIG. 12 is an exemplary representation of a short clearing event in accordance with an embodiment of the present invention. As shown, the short circuit detection event occurs at point 1105 (whether it is an actual short circuit or premonition of a short circuit about to occur), after the short circuit detection event the power supply (for example in FIG. 10) drives the current from an EN state to an EP state as shown. In the example shown the current is driven to a first current level 1123 to establish an arc sufficient to ignite the welding arc and to begin clearing the short circuit, for example to begin the necking down of the electrode. After the first current level 1123 the current is driven to a second current level 1125 while the short is being cleared, where the second current level 1125 is less than the first current level 1123. In this embodiment the lower second current level will aid in preventing the creation of too much spatter as the short clears at point 1107. In some exemplary embodiments, after the short clears 1107 the waveform can be driven back to an EN state. However, in the embodiment shown a boost pulse 1121 is utilized to burn back the electrode and ensure arc stabilization before returning to the EN state, where the current peak for the boost pulse 1121 is higher than either of the first or second current levels. In some exemplary embodiments, the current is returned to EN after the boost pulse 1121. However, as shown in FIG. 12 in other exemplary embodiments an arc stabilization period 1127 is implemented in which the current remains EP for a duration while the arc and weld puddle stabilizes before the current is returned to the EN state. In some exemplary embodiments the arc stabilization period is in the range of 0.5 to 5 ms. In other exemplary embodiments the range can be longer if needed. Further, in some exemplary embodiments, the current level of the arc stabilization period is the same as the current level of the background portion 1101 of the EN waveform 1100. For example, if the background 1101 level is −40 amps, the current level for the period 1127 will be +40 amps. In other exemplary embodiments, the current level for the arc stabilization period 1127 is in the range of 85 to 120% of the background current 1101 level. In such embodiments, the stabilization period 1127 can also be used to aid in the control of heat input into the weld during welding. That is, the current level can be adjusted to ensure that a sufficient and/or stable heat input is into the weld. By varying this current level, the power supply can use the EP stabilization period 1127 to control an aspect of the heat input into the weld. Additionally, the duration of the period 1127 can be adjusted by the power supply (for example in FIG. 10) so that the heat input is controlled as desired. For example, if it was desired to increase the heat input into the weld, the power supply can increase the current level and/or duration of the period 1127 to increase the heat input into the weld. Further, in other exemplary embodiments of the present invention, the current level for the period 1127 is less than that of the background level 1101 and is in the range of 75 to 95% of the background level. (For example, if the background level is −50 amps, the range would be +37.5 to +47.5 amps). In such embodiments, the heat input from the period 1127 is kept minimal to the extent it is desired to maintain a low heat input.

Figure 13:
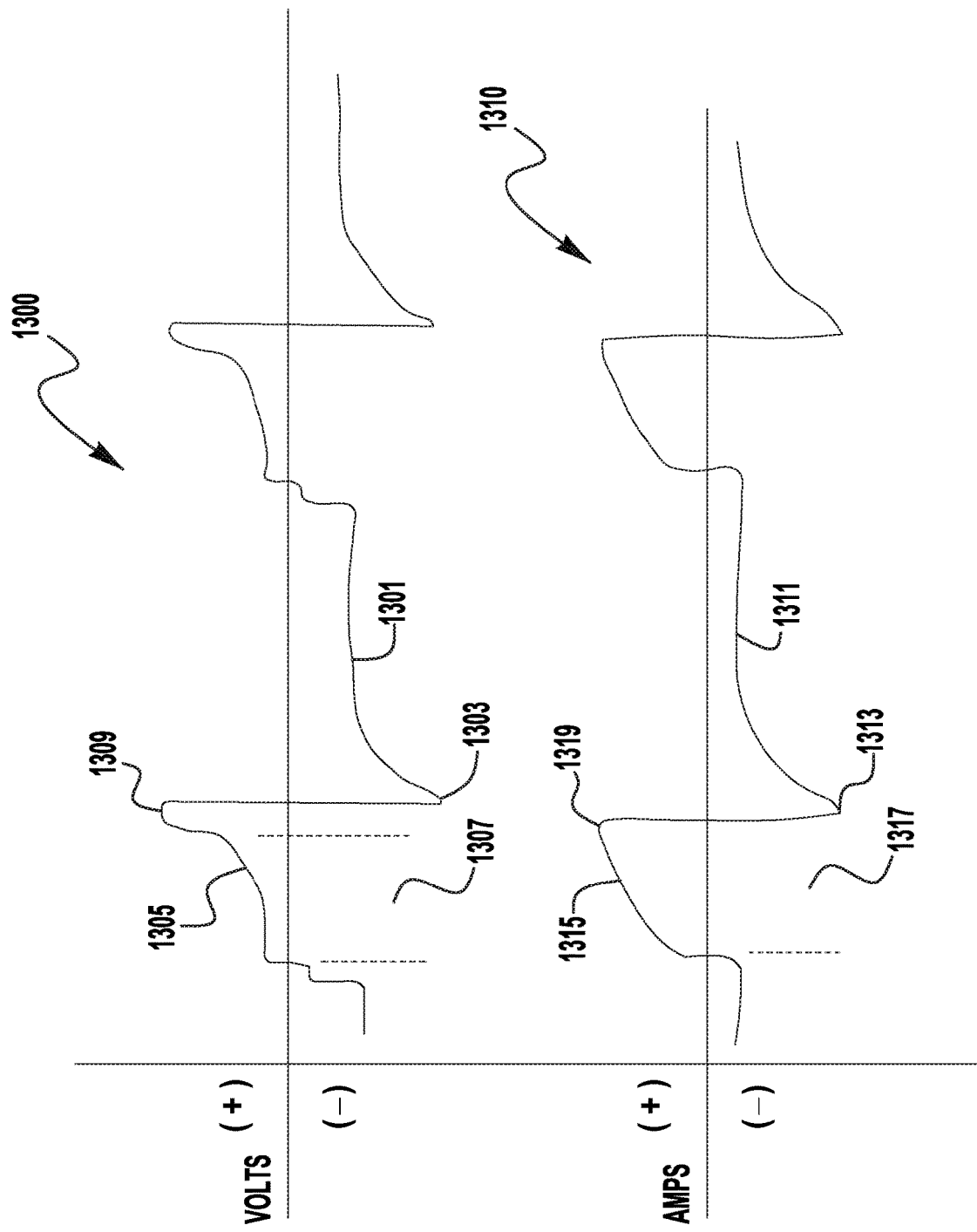
FIG. 13 illustrates an example of a voltage and current welding waveform in accordance with another exemplary embodiment of the present invention.

As explained previously exemplary embodiments of the present invention are not limited to using the current waveforms or welding processes discussed above, and other welding processes can be utilized. For example, as shown in FIG. 13 a constant voltage type waveform can be used, where the majority of the waveform is in the negative polarity while the short clearing is in the positive polarity. As shown, the voltage waveform 1300 have a peak 1303 and background 1301 voltage that are in the negative polarity but when a short circuit detection event is detected the voltage and current are changed to a positive polarity for a short circuit clearing portion 1305 (voltage) and 1315 (current). In the exemplary embodiment shown a plasma boost portion (1309 and 1319) is implemented after the short circuit is cleared. Of course, in other exemplary embodiments the plasma boost may not be utilized, or other post short clearing functions can be used. The transition from negative to positive current can be implemented as described above.

As described above, various methods can be used to detect or determine the short circuit event, including known methods of detecting or predicting short circuit events. For example, some exemplary embodiments can use a detected arc power and/or arc voltage to determine when a shorting event is about to occur, or has already occurred. In exemplary embodiments, a threshold value for voltage and/or power can be set so that when the detected voltage or power surpasses the voltage and/or power threshold the change in polarity is initiated. For example, in some embodiments, the threshold voltage and/or power levels are selected based on a desired arc length. This will ensure that the polarity switches when the arc length is at or near a desired arc length prior to switching. In some exemplary embodiments, the desired arc length is in the range of 0.2 to 0.5 mm. This method of control can be desirable in some embodiments as when using a negative polarity the arc force pushes up on the consumable harder than on the puddle and thus the arc length will grow quickly. By detecting and utilizing the instantaneous power and/or voltage and comparing that to a threshold value—which corresponds to a switching arc length—the polarity can be switched at a desired point. The threshold power and/or voltage values can be set based on various input parameters related to the welding process and operation, including user input information, and the power supply/controller using a look-up table, or the like, can set the desired polarity switching power and/or voltage values. It should be noted that in embodiments of the present invention a short circuit event or a short circuit detection event as described herein can be either the detection of the actual short circuit or the prediction of an imminent short circuit using the methodologies described herein. Further, as discussed herein a short clearing event or short circuit clear event can mean either the actual disconnection of the consumable from the puddle or the determination of an imminent clearing or separation of the consumable. Again, the short clearing event can be detected using the methods described above to detect the short circuit event, for example, using voltage, dv/dt, etc. For example, detection of the presence or reignition of an arc—which indicates separation can be used and encompassed in a short clearing event. Such detection methods and circuits are known to those of skill in the art. In exemplary embodiments herein the same short circuit detection circuit (which are known) can be used to detect the short clearing event. Again, such circuits are known and their structure and operation need not be described in detail herein.

In other exemplary embodiments the power supply can also utilize a circuit to detect or determine the ratio dj/dt (change of output joules over the change of time) for the welding waveform and when the detected rate of change reaches a predetermined threshold the power supply switches from negative to positive polarity. For example, when utilizing a negative pulse welding waveform a large molten ball is created at the end of the electrode during each pulse. The dj/dt detection circuit (which can be constructed similar to a di/dt or dv/dt circuit, and use known circuit configurations) can exist in the controller 170 and/or the generator 180 and can be used to predict the size of the molten ball or the proximity to a short circuit event and when the detected dj/dt ratio reaches a predetermined threshold or value the current is switched from negative to positive polarity. In exemplary embodiments, the dj/dt predetermined threshold or value is determined in the controller 170 based on input information related to the welding operation and is present before the welding operation begins and the actual dj/dt ratio is compared to this threshold to determine when the current should be switched from negative to positive polarity. In exemplary embodiments of the present invention, the dj/dt ratio can be associated with the relative size of the molten ball on the end of the electrode such that when the dj/dt threshold is reached the molten ball is ready for transfer from the electrode to the puddle, but the ball has not yet made contact with the puddle. Thus, before ball transfer the polarity of the current switches from negative to positive but stays at a low current level so that the droplet can move towards the puddle and touch the puddle with a relatively low arc force. Once the molten ball contacts the puddle, then the controller initiates a short clearing function in the positive polarity and once the short clearing function is completed switches the polarity back to negative. By using a low current level after switching to positive polarity the ball transfer can occur in a positive polarity with a low arc force to provide a stable and controlled droplet transfer. In some exemplary embodiments, the low current level after switching positive is in the range of 5 to 100 amps and this current level is maintained until the droplet makes contact with the puddle, at which time a short clearing function is implemented. In other exemplary embodiments, the current is in the range of 5 to 40 amps.

Further exemplary waveforms that can be used with exemplary systems described and incorporated herein are shown in FIGS. 14 through 19 described below. The exemplary waveforms discussed below can be created by the exemplary systems and control methodologies discussed above, as well as discussed in the incorporated patents above—namely U.S. Pat. Nos. 6,215,100 and 7,304,269, the entire disclosures of which are incorporated herein by reference in their entirety. Further, the disclosure of U.S. Pat. No. 8,373,093 is also incorporated herein in its entirety. The exemplary waveforms described herein and below can be used as needed to control heat input into welding operations, as well as provided desired weld penetration without compromising quality of the weld. The waveforms and welding methodologies will be discussed in turn. It should be noted that the waveforms described below can be used in any number of welding type operations, such as GMAW, and can be used with various types of consumables, such as solid, flux cored, and metal cored without departing from the spirit and scope of the present invention.

Figure 14:
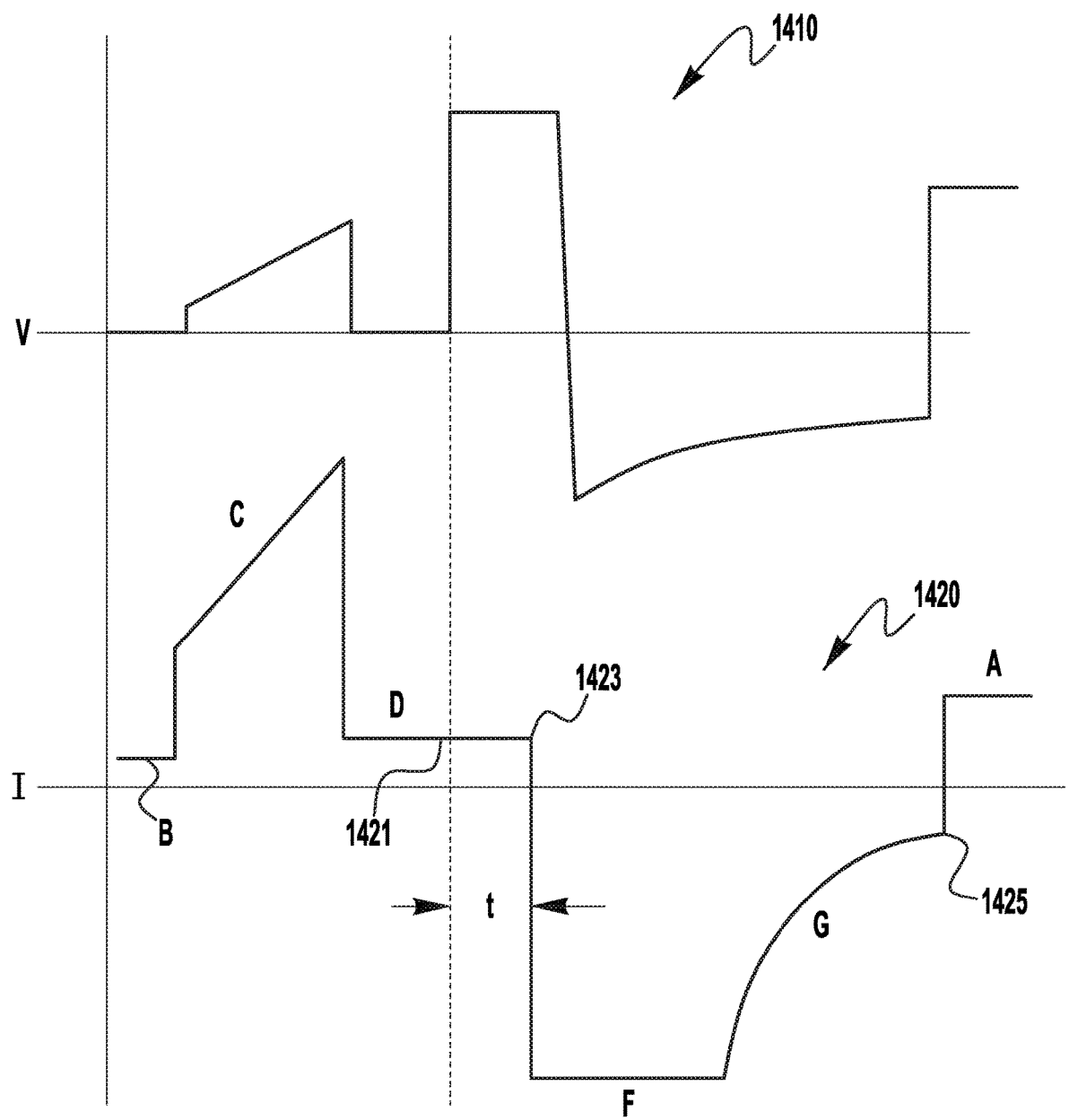
FIG. 14 illustrates an example of a voltage and current welding waveform in accordance with a further exemplary embodiment of the present invention.

Turning now to FIG. 14, an exemplary voltage 1410 and current 1420 waveform is shown. In some respects the current waveform 1420 is similar to a known STT type welding waveform, which is known. For example, an exemplary STT type waveform is shown in at least FIGS. 7 and 8 of the above reference '100 Patent and FIG. 1A of the '093 Patent referenced above (along with their respective accompanying discussions). Because of this incorporated references, the details of an STT type waveform will not be described herein. However, in exemplary embodiments of the present invention, the waveform 1420 can be used to appreciably reduce heat into a welding operation, and thus allow for thinner materials to be welded, as well as other advantages obtained from having a reduced heat input. As shown in FIG. 14, this is accomplished by breaking the STT pulse into two different polarities, where a negative peak and tailout current are used to reduce heat input. As with typical STT the current has a background current level (shown at A) which heats the molten ball at the end of the electrode. As the molten ball makes contact with the puddle and begins to short the current level is dropped (at point B) so as to allow the ball to wet into the puddle. After the current level drop at B a positive pinch current is used at point C to allow the ball to pinch off from the electrode. As the pinch point approaches the current level is dropped again—at point D—to a level to allow the ball separation to occur without significant spatter. This level can be below the background current level. This is, again, similar to known STT type processes as described in the patents incorporated herein. In known STT waveforms once the arc is re-established during the low current level at point D a peak current pulse is initiated. However, unlike those known systems, in current exemplary embodiments a stabilization current phase is initiated—see E. Thus, in exemplary embodiments, rather than immediately pulsing the current, a low positive current level is maintained, for a predetermined duration t to allow the arc to stabilize before the peak current pulse is initiated at an opposite polarity than the pinch current pulse C. This predetermined duration t allows the arc to reach a stabilized state before a change of polarity is initiated, and can be predetermined by the controller/CPU of the welding power supply based on input parameters of a given welding operation. For example, the predetermined duration can be determined based on the electrode type, wire feed speed, peak current level, travel speed, etc. Using this information, a look-up table can be used to determine the stabilization duration t. In exemplary embodiments, the stabilization duration t is in the range of 0.05 to 10 ms. In other exemplary embodiments, the duration t is in the range of 0.1 to 2.5 ms. As shown the stabilization duration begins at point 1421. In exemplary embodiments, the stabilization duration t begins when the initiation of the arc is detected. This can be determined based on the detection of a voltage level—exceeding a voltage threshold level and/or the use of dv/dt detection, where the rate of change of the voltage can be detected to determine that an arc has been established. In prior systems, the point 1421 is the point at which a peak pulse would have been initiated. However, in the shown exemplary embodiment the duration t is initiated. After the expiration of the duration t, at point 1423, the current polarity is changed to initiate the peak current pulse F, and the following tailout G. In this waveform, the peak and tailout are done in same polarities, but are different from the pinch and background currents (see generally A, C, D and E). The peak and tailout serve to create separation between the electrode and the puddle and to supply heat to melt the end of the electrode creating the next droplet readying it for transfer. By using this opposite polarity a same or similar separation distance is achieved but with less heating action, thus adding less unwanted heat to the puddle. Thus allowing for the welding of thinner and more heat sensitive materials. After the tailout period G the current is switched back to the opposite polarity at point 1425. In exemplary embodiments, this switch point is at a predetermined current switching level. In some exemplary embodiments, this current switching level can be below 75 amps. In other exemplary embodiments, the switching current is in the range of 35 to 150 amps. In any event, the switching current should be at a level such that the switching circuitry is not overheated. The switching current can be predetermined by the welding system controller using information, such as peak current, etc. from the welding operation. In other embodiments, the switching current and can be predetermined based on the limitations of the welding system such that the circuitry is not overheated or compromised during operation.

It is noted that in the shown embodiment, the current level during the duration t is at the same level as the separation current during phase D. However, in other exemplary embodiments, this may not be the case. For example, in some embodiments, the stabilization current E can be higher than that of the separation current D, while in other embodiments, it can be lower. For example, in some exemplary embodiments the stabilization current E can be in the range of 5 to 25% higher than that of the separation current. Of course other embodiments are not limited to this and other variations can be used without departing from the spirit and scope of the present invention.

Figure 15:
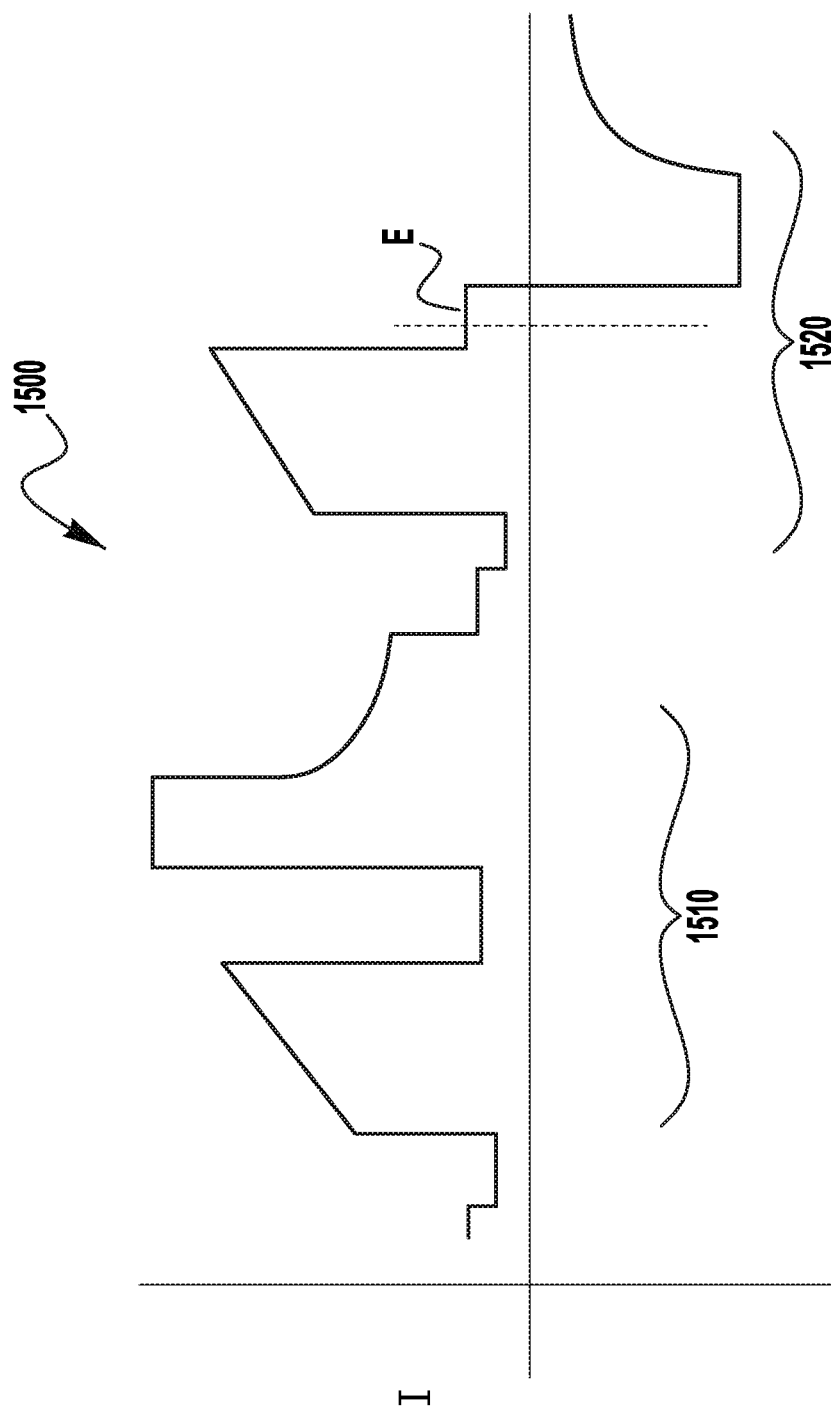
FIG. 15 illustrates an example of a current welding waveform in accordance with another exemplary embodiment of the present invention.

FIG. 15 depicts another exemplary embodiment of the present invention, where an exemplary current waveform 1500 is shown. In this embodiment the overall welding waveform comprises alternating periods of the waveform. For example, the waveform 1500 can have a first period 1510 where the waveform implements at least one single polarity pulse cycle (for example an STT cycle) followed by a period 1520 of the waveform in which the alternating polarity cycles are used. For example, in some embodiments, for at least a portion 1510 of the welding waveform 1500 a plurality of positive STT type cycles are performed and for a second portion 1520 of the waveform 1500 the alternating current STT cycles are used. This embodiment can be used to control the heat input to reach a heat input level as needed. Thus, in exemplary embodiments the overall waveform 1500 can have alternating periods where the positive period 1510 last from 1 to N cycles and the alternating period 1520 lasts for 1 to P cycles. The number of cycles determined in each alternating period can be determined the power supply controller based on user input information—to attain a level of desired heat input, or can be specifically determined by the user using a user input device on the power supply. Further, in some exemplary embodiments the welding system can monitor and/or calculate the overall heat input from the welding operation and if the detected/determined heat exceeds a threshold level the power supply automatically implements a second period of the waveform comprising a plurality of alternating current cycles as described above. In such a system, the power supply controller can continue to monitor and/or determine the heat input and at such time as the heat drops below a threshold level the power supply can revert back to the single polarity cycle period.

Figure 16:
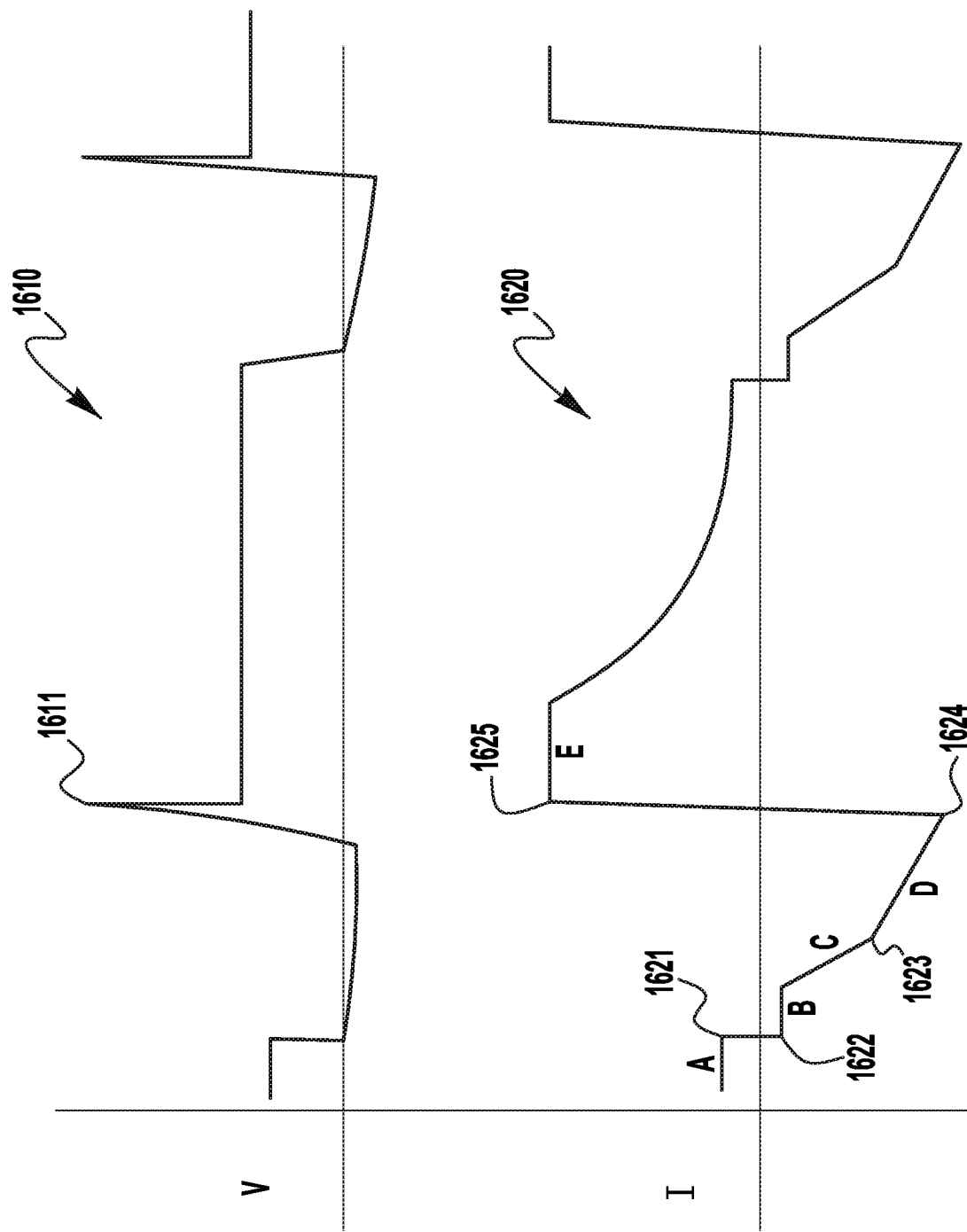
FIG. 16 illustrates an example of an additional voltage and current welding waveform in accordance with an exemplary embodiment of the present invention.

Turning now to FIG. 16, another exemplary welding waveform is depicted. In addition to aiding in the management of heat input, the welding waveform shown in FIG. 16 aids in protecting against the occurrence of magnetic arc blow during welding, particularly when welding in a root pass, while providing the desired penetration. It is generally known, that when welding steel, for example steel pipe, the welding arc can be pulled out of the weld joint because of residual magnetism imparted in the workpiece due to welding in a single polarity. Thus, some welding techniques try to use AC type welding waveforms in these applications in an effort to minimize the magnetization. However, these solutions result in welding waveforms that have decrease heat and thus decreased penetration. This is undesirable, particularly in closed root pass welding operations where sufficient heat is required to obtain sufficient and complete penetration. FIG. 16 depicts an exemplary voltage and current waveform that can manage heat input, reduce issues of magnetization and arc below, and yet achieve the desired penetration needed for various welding operations, including root pass welding.

As shown in FIG. 16, an exemplary voltage 1610 and current 1620 waveform is shown. Like that discussed above the current waveform 1620 is similar, in some respects to the above discussed STT type waveform, in that current is pinched after the short is detected and when the arc is re-ignited a peak pulse is used. However, as shown and discussed below, this exemplary waveform differs in some important respects. For example, in the embodiment shown in FIG. 16, the short circuit and thus the transfer of the droplet from the consumable occurs in the negative polarity. This is explained more fully below. Like known waveforms the background current is in the positive polarity—A. The background current is at a current level that should promote a short circuit event. It should be noted that as used herein "short circuit event can mean either an actual short or can also mean the prediction of an imminent short. Exemplary embodiments can use either as a short circuit event and can control the waveform as described herein based on the detection of the that event. Further, to the extent some of the embodiments herein (with respect to any waveforms or figures) refers to a short circuit detection or short circuit prediction, that is not intended to be limiting but intended to simply described a short circuit event. In some exemplary embodiments, the background current should be below 100 amps, but high enough to sustain an arc. Of course, the current level may vary depending on the wire feed speed, etc. At the detection of the short circuit 1621 (when the consumable makes contact with the puddle) the current is driven to a low negative polarity level (droplet engagement level) 1622. Thus, while the arc is extinguished due to the short the polarity is changed. The short can be detected via known detection methods. The initial current level B should be relatively low, but enough to allow the droplet to engage with the puddle. In exemplary embodiments the negative engagement level B is in the range of 35 to 75 amps. In other exemplary embodiments, the level is in the range of 40 to 65 amps. This engagement level B is maintained for a predetermined duration of time that allows for sufficient engagement of the droplet to the puddle. In exemplary embodiments, the duration of the engagement level B is in the range of 0.3 to 2 ms. In other exemplary embodiments, this engagement duration is in the range of 0.5 to 1 ms. The engagement duration can be determined by the controller based on user inputs, such as WFS, peak current, input power, etc. After the engagement period expires the negative current is increased C at a first ramp rate to a point 1623 and then via a second ramp rate D to a peak current level 1624. Once the peak current level 1624 has driven the pinch current high enough to re-ignite the arc or for the dv/dt detection to predict arc re-ignition, the output is dropped quickly and (when the desired low current is reached) the polarity is reversed to a positive pulse E having a peak current level 1625, where, in some exemplary embodiments, the peak positive current level 1625 is less than the peak negative current level 1624. In exemplary embodiments, the negative peak 1624 reaches a level that is high enough to clear the short, at whatever level is needed and may be larger than the positive peak current 1625. In some exemplary embodiments, the positive peak current 1625 is within the range of 50 to 150% of the negative peak current 1624. In further exemplary embodiments, the peak current is in the range of 90 to 110% of the peak current 1624. Further, the first and second ramp rates (C and D) are each less than the ramp rate used to change the current from the peak negative point 1624 to the peak positive point 1625. It is noted that in the shown embodiment the peak positive current level 1625 is less than the negative current peak level 1624. However, in other exemplary embodiments this may not be the case. In some embodiments, the peak current 1625 can be determined by a look up table based on welding input parameters and the pinch current 1624 is determined by how much pinch force is required to transfer the droplet, and thus the peak 1625 can be higher than the peak 1624 in some scenarios.

As explained above, a first ramp rate C is used to drive the negative current from the droplet engagement level 1622 to a transition level 1623. The first ramp rate C is higher than the second ramp rate D. Further, the transition level/point 1623 is at a current level which is in the range of 40 to 150% of the positive peak current level 1625. In other exemplary embodiments, the transition point 1623 is in the range of 50 to 75% of the positive peak current level 1625, while in yet further embodiments the point is in the range of 55 to 65% of the peak current 1625. In embodiments, having such a relationship allows for the smooth clearing of a short. After the transition point 1623 the current ramp rate is slowed to a second ramp rate portion to take the current to the negative peak 1624. In exemplary embodiments, the negative peak 1624 is in the range of 200 to 600 amps, and in some exemplary embodiments is in the range of 275 to 350 amps. In other exemplary embodiments, the current is increased during the second ramp rate phase D until the detection of an event. In some embodiments, the event is the detection of the separation of the droplet from the consumable or can be the detection or determination of imminent separation. For example, a premonition circuit can be used to detect a voltage change or a change in dv/dt which precedes a droplet separation from the consumable. Thus, in some exemplary embodiments, the detection or prediction of an event triggers the change in polarity from negative to positive, as shown. This detection event/threshold level can be determined based on welding parameters. The above described current ramp rate profile allows the droplet transfer to occur in a controlled manner, while in negative polarity. In some exemplary embodiments, the arc detection/prediction (via a premonition circuit) event causes the controller to close a current reduction device or circuit (which are generally known), and when the current drops below a threshold (for example 50 to 100 amps) the polarity is changed.

After the detection/prediction of the droplet separation the current is changed to a peak positive level 1625 at a fast current ramp rate, as described above. Also, as shown, in the corresponding voltage waveform 1610 a voltage spike 1611 occurs during the transition from negative to positive. In exemplary embodiments, this voltage spike is in the range of 60 to 90 volts. This voltage spike aids in quickly reestablishing the welding arc as the current passes from negative to positive (as it is understood that the arc is temporarily extinguished as it passes from negative to positive) while minimizing explosive risk in the arc polarity transition. In some embodiments, the voltage spike is an indication that the droplet has separated from the electrode/consumable at the switching of the polarity or at least just prior to the switch. Again, this voltage spike aids in relighting the arc after the current passes from the negative to the positive polarity.

The current peak of the positive pulse E is typically maintained for a period of time before the current is tailed out to the background level until another short is detected. The duration of the positive peak can be predetermined in some exemplary embodiments, and be in the range of 1 to 5 ms, and in other embodiments can be in the range of 1 to 3 ms. The duration can be determined based on aspects of the welding operation, such as wire type, shield gas type, WFS, etc. The exemplary embodiments described above can improve a welding operation by minimizing arc blow, managing heat input and providing optimal weld penetration. Additionally, embodiments as described above improve arc reignition after a short circuit without the loss of heat input common to most variable polarity processes.

Figure 17:
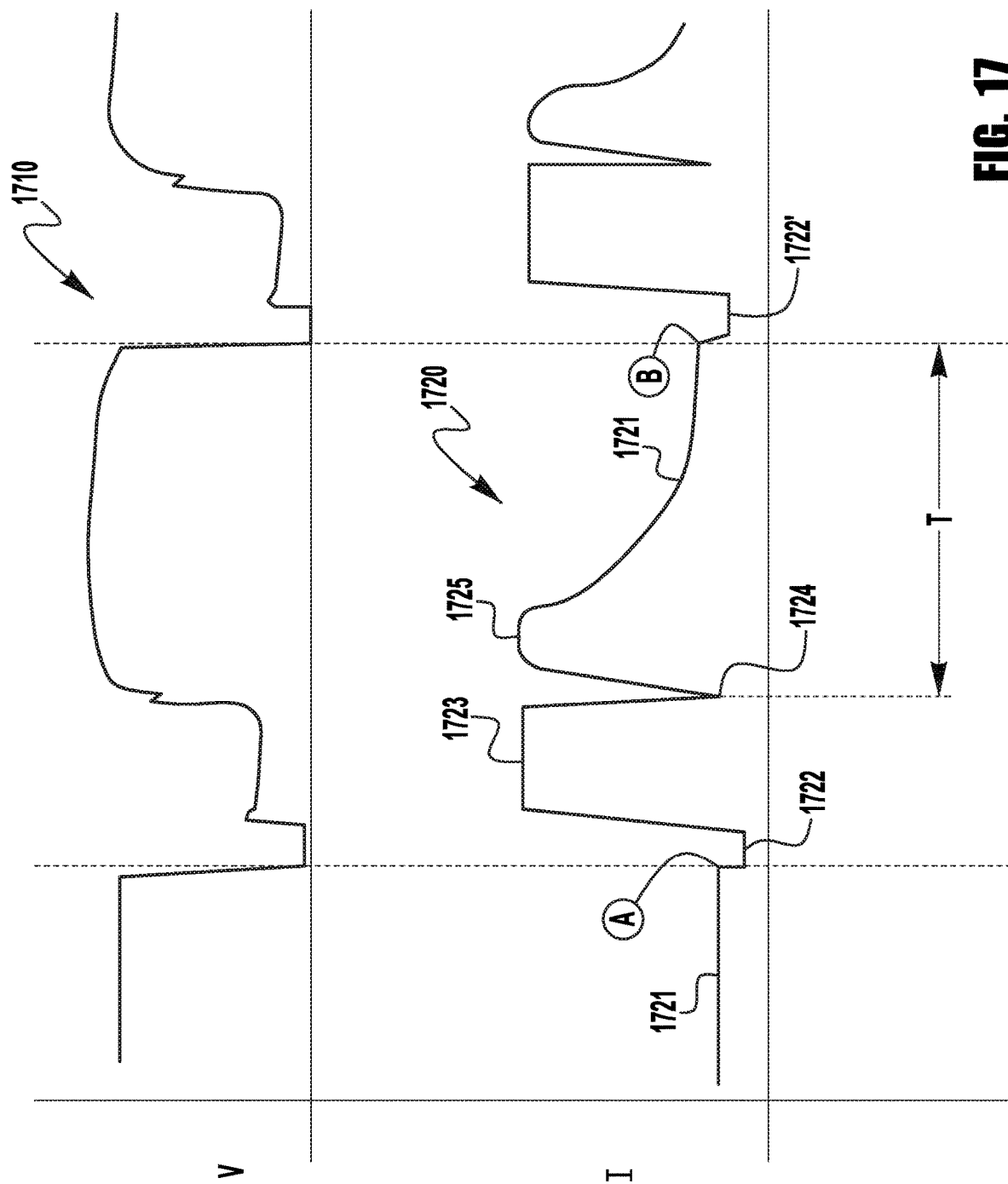
FIG. 17 illustrates an example of a voltage and current welding waveform in accordance with an additional exemplary embodiment of the present invention.

Turning now to FIG. 17, a further exemplary welding waveform is shown. Like the above exemplary embodiments, this depicted embodiment has similarities to the STT type waveform discussed above, and it is noted that the components of the waveform shown in FIG. 17 (and FIGS. 18 and 19) serve similar purposes as those discussed above, and thus will not be repeated here. It is noted that in exemplary embodiments, the waveform described with respect to FIG. 17 can be used in applications, where the wire feed speed appreciably exceeds 200 ipm, and can be used in welding operations where the WFS is in the range of 200 to 400 ipm. Of course, other speeds can also be used, but in some embodiments the performance of the waveform is improved in higher wire feed speed operations.

As shown in FIG. 17, a voltage 1710 and current 1720 waveforms are shown. These waveforms are exemplary and other embodiments can use similarly structure waveforms. In some of the embodiments discussed above, an event occurs after a detection of a short between the wire and the puddle. However, in some situations the shorting event may occur at different times depending on the welding process and this can affect the rhythm of the welding operation. In the FIG. 17 embodiment a short detection threshold time limit is used. As shown, the current is at a background level 1721 until a short event is detected at point A and the current is dropped to a lower level 1722 after the detection/prediction of the short. The background level can be in the range of 50 to 150 amps. The low current level 1722 can be anywhere in the range of 0 to 50 amps, as in some embodiments the current can be turned off (0 amps) or maintained at a low level. In some embodiments, the low level 1722 is maintained for a duration in the range of 0.2 to 8 ms, and in other embodiments, the duration of the low level is maintained for a duration of 0.4 to 1.6 ms. After the low current level 1722 the current is increased to a pinch peak current level 1723, which can be in the range of 300 to 500 amps, and is maintained for a duration until droplet separation is predicted or detected. At separation the current level is dropped quickly to a level 1724 similar to that of the background current 1721. This drop allows the droplet to separate without spatter or a significant explosion event. The current is then increased to a second peak level or plasma boost level 1725. In exemplary embodiments, the peak current level of the peak level 1725 can be in the range of 300 to 500 amps and can be the same peak level as the pinch peak level 1723. In other exemplary embodiments, the peak level 1725 can be higher than the level 1723, while in others the peak 1725 can be less than the peak level 1723. The peak current 1725 is maintained for a duration and then is ramped down to the background level 1721 as shown. Further, exemplary embodiments have a predetermined short detection duration T period. This duration is initiated at the ignition of the arc, after the droplet is separated—at 1724. The detection of the arc can occur with any known arc detection circuit. For example, the voltage or rate of change of the voltage can be monitored and used to determine that an arc has been created. As these circuits are well known they need not be described in detail herein. This duration is monitored via a timing circuit, timer, etc. within the controller of the welding system. Such timers or timing circuits are well known and need not be described in detail herein. The controller looks for the detection of a short or the expiration of the predetermined duration T, whichever occurs first. For example, if the consumable shorts prior to the expiration of the duration T then a short clearing function is initiated as described herein. However, if a short is not detected prior to the expiration of the time period T, then the current is dropped to a level lower 1722' than the background level 1721, after the expiration of the period T (see point B). That is, if a short does not occur within a predetermined amount of time (period T) the current is dropped to a low level (or turned off) to ensure or promote that a short event occurs. During the low current 1722' portion the current is maintained at the low level until a short event occurs. This low current level aids in preventing the arc from continually consuming the consumable and promotes prompt contact between the consumable and the puddle. The low current level 1722' is maintained until a short is detected and then the short clearing can occur as described herein, or via other known methods. Thus, embodiments of the present invention ensure that a relatively consistent shorting frequency occurs by ensuring that a short occurs in desired intervals. In exemplary embodiments, the current level 1722' (initiated after the expiration of the period T) can be the same as the current level 1722 after a short is detected, and in some embodiments can be in the range of 0 to 50 amps. In some embodiments, the current can be in the range of 0 to 30 amps. Alternatively, in other embodiments, the output power after the expiration of the period T can be in the range of 0 to 500 watts. However, in other exemplary embodiments, the current level 1722' can be higher, or lower than the level 1722. In either case, once the short is detected it is cleared as described herein, and the controller of the system continually monitors the welding process for shorts or the expiration of the period T, whichever occurs first. It is noted that the timer or timing circuit described above can be constructed and operated similar to known timing circuits, and thus a detailed discussion of its structure and operation need not be described herein.

In exemplary embodiments, the period T is predetermined based on welding inputs for the welding process. Such inputs can include WFS, consumable diameter, consumable type, peak current, voltage settings, etc. The controller of the welding power supply/system can use these inputs with a look up table, state table, etc. to determine the duration of the period T. In exemplary embodiments, the period T can be in the range if 8 to 30 ms. In other exemplary embodiments, the period is in the range of 12 to 20 ms. Of course, other periods can be used to achieve the desired performance. As indicated above, embodiments of this type can allow for consistent and rhythmic deposition of the consumable at high WFS, and allow for the creation and efficient transfer of large droplets to achieve a high transfer/deposition rate.

It is noted that the tailout portion from the peak 1725 to the background 1721 can be shaped as needed and desired for a particular welding operation.

Figure 18:
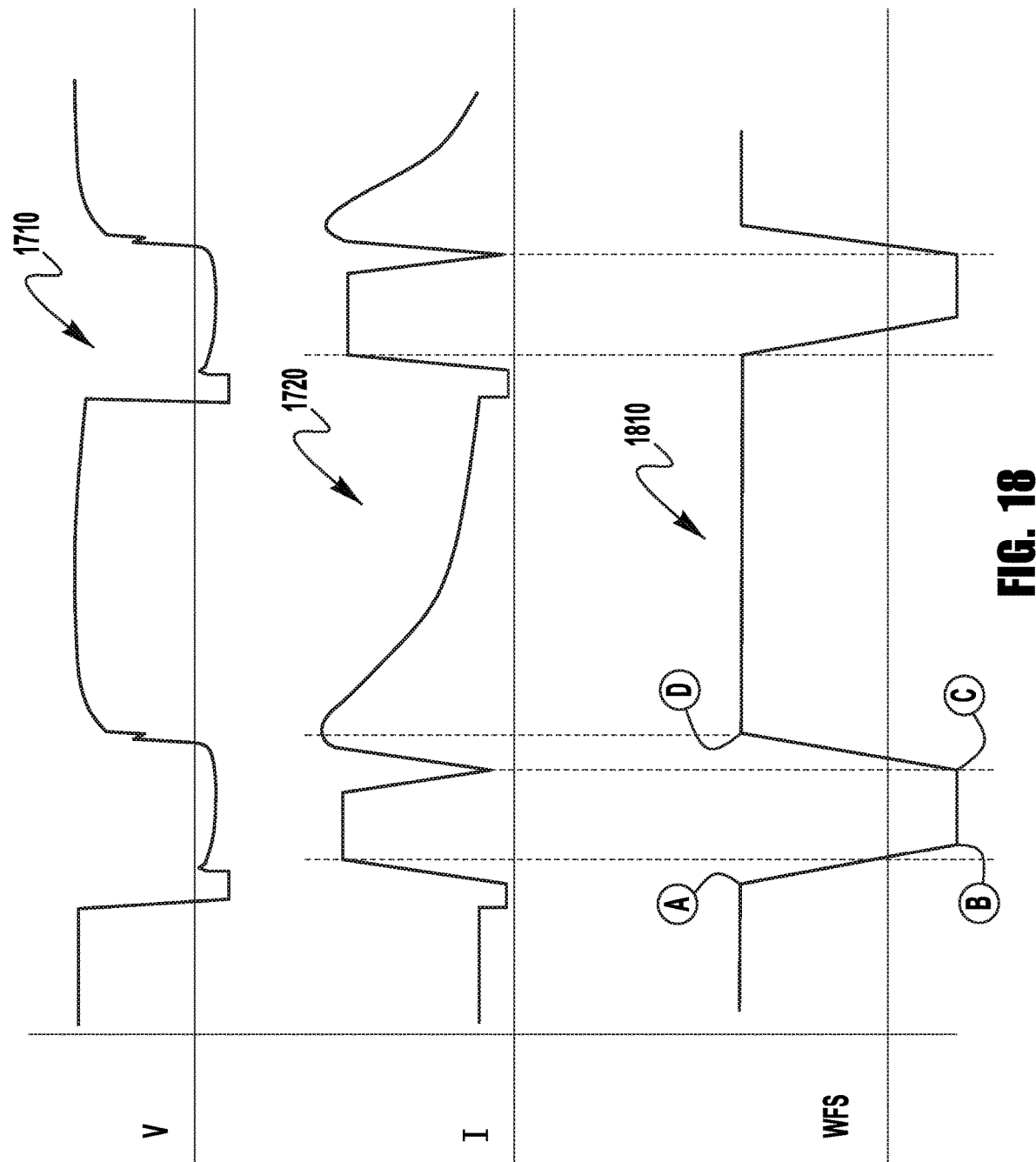
FIG. 18 illustrates an example of a voltage and current welding waveform in accordance with an another exemplary embodiment of the present invention.

FIG. 18 depicts similar waveforms to those shown in FIG. 17. Because of the similarity of the current waveform, like numbers have been used and the details will not be repeated. However, in this embodiment a wire feed speed waveform 1810 is shown in which the wire feed speed and direction is changed in conjunction with the current waveform. That is, in exemplary embodiments the wire/consumable is advanced until such time that a short circuit is created and confirmed by the power supply. In exemplary embodiments, this confirmation can be detected by either detecting current and/or voltage of the output signal. In exemplary embodiments, the short is confirmed at the point the pinch pulse current reaches its peak (point A). After this point, the wire direction is reversed to a retraction speed B. In exemplary embodiments, the peak retraction speed is less than the advancement speed. However, in other embodiments, it can be the same, or more. In exemplary embodiments, the pinch force (via the pinch pulse 1723) is maintained until the consumable reaches its peak reversal speed (point B). After some duration at the peak reversal speed, the current is reduced (as explained with respect to at least FIG. 17) to point 1724. At about the time the current is reduced to point 1724 the wire is being pulled out of the puddle (point C). In some exemplary embodiments, the current at point 1724 is less than 50 amps, and in some embodiments can be in the range of 0 to 50 amps. Because the wire is being pulled out of the puddle at a low current level the spatter can be significantly reduced. Also, at point C as the current starts to increase again for the plasma boost pulse, the wire feed speed is reduced to start advancement of the wire again. In exemplary embodiments, the wire reaches its peak advancement speed at about the time the plasma boost pulse 1725 reaches its peak current level. This constant advancement and retraction of the wire as described above results in improved welding performance and reduced spatter during welding. In some exemplary embodiments, the wire retraction described above can be used with the duration T described with respect to FIG. 17, and in other embodiments can be used when the duration T is not utilized.

Figure 19:
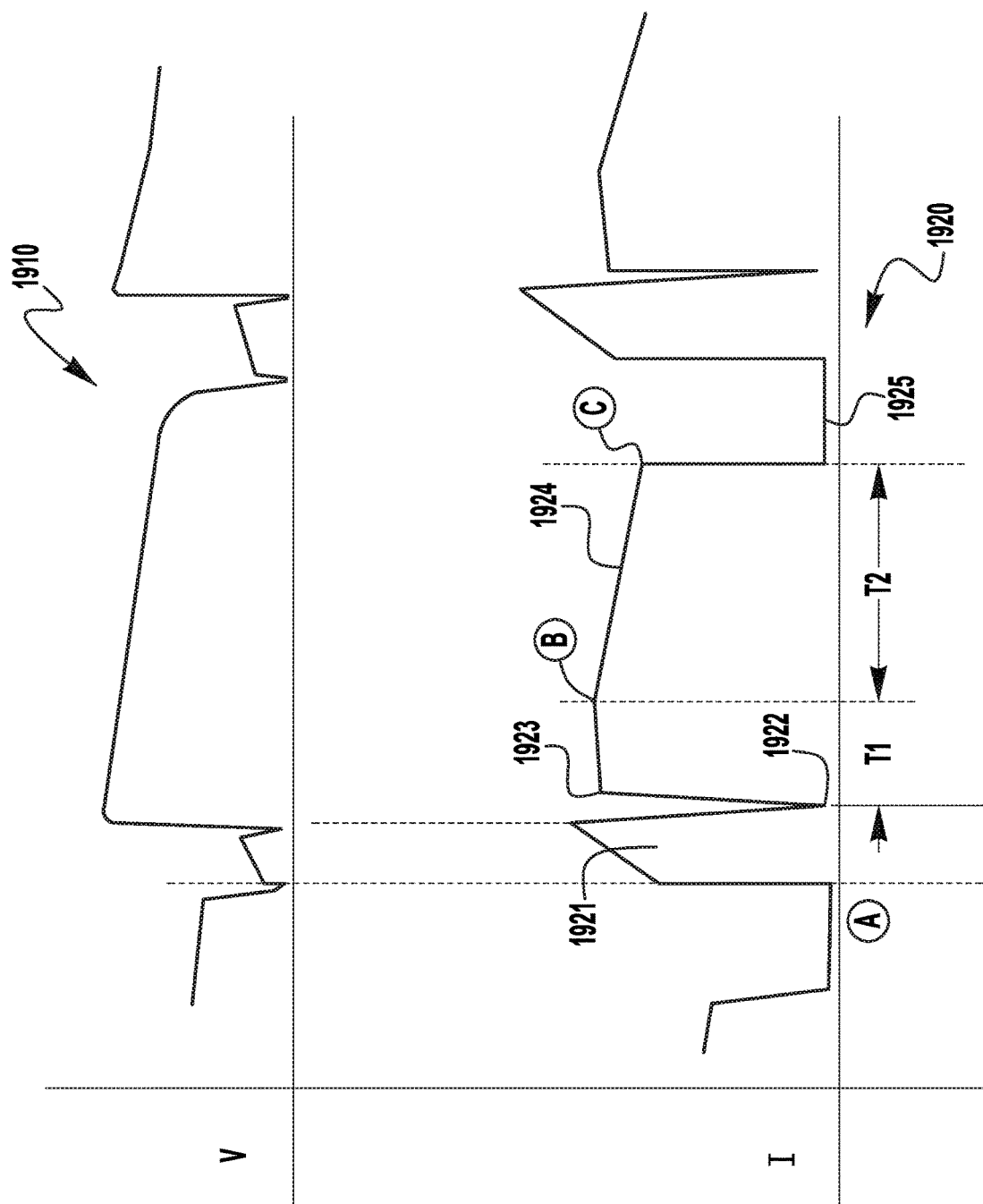
FIG. 19 illustrates an example of a voltage and current welding waveform in accordance with a further exemplary embodiment of the present invention.

FIG. 19 is yet another exemplary waveform of the present invention. It is known that in some applications the range of short arc welding is limited by physics. That is, when the droplet size reaches about the size of the consumable other forces within the welding process change the short arc transfer process to a globular transfer process which can tend to have more spatter and does not short in a predictable manner. Further, in some applications known short arc or STT welding operations tend to result in less than desired penetration of the welding operation. Therefore, for certain welding applications it is desirable to use an STT or short arc type transfer method that achieves a desired level of penetration. Embodiments of the present invention can accomplish this without compromising welding quality by utilizing a high background current for a predetermined duration and then reducing the background to a low level to induce shorting. This is shown in FIG. 19.

FIG. 19 depicts each of an exemplary voltage 1910 and a current 1920 waveform. Again, like other exemplary embodiments discussed herein, the ideology of this embodiment is similar to that of STT and short arc, and can be implemented on known power supplies capable of creating STT or short arc type waveforms. Further, exemplary embodiments can be used on welding applications with high wire feed speeds, such as in the range of 200 to 400 ipm. Additionally, utilization of the waveforms discussed herein can be done with a 100% $CO_2$ shielding gas, which is cheaper than shielding gases used for other short arc welding applications. In exemplary embodiments, the average current of the waveform 9120 is in the range of 200 to 300 amps and the average voltage is in the range of 25 to 35 volts. Further, because of the structure of the waveform (discussed more below) the shorting frequency of the exemplary waveforms can be in the range of 15 to 60 hertz, and in other embodiments is in the range of 20 to 30 hertz. Additionally, the droplet size realized using the exemplary waveforms described herein is resembles globular transfer (using a short event to transfer), but at a higher penetration than that achieved by STT or traditional short arc transfer.

Like other waveforms discussed herein, after a shorting event A, a pinch current pulse 1921 is initiated. The pinch pulse 1921 is used to aid in pinching off the droplet after it shorts to the puddle. The pinch pulse 1921 can have a peak current in the range of 300 to 600 amps. As the droplet is about to break off the current is reduced to a low level 1922 (in the range of 0 to 75 amps) to avoid an explosive separation of the droplet. After the droplet separates, the arc is reignited and the current is increased to a pulse peak level 1923 which is less than the peak of the pinch pulse 1921. In exemplary embodiments, the peak level 1923 is in the range of 250 to 300 amps. In some exemplary embodiments, the peak level 1923 is in the range of 60 to 85% of the highest current level for the pinch pulse 1921. In other exemplary embodiments, the peak current level 1923 is in the range of 65 to 80% of the highest current level for the pinch pulse. This peak current level 1923 is maintained for a predetermined period of time T1, which can be in the range of 3 to 10 ms, and in other embodiments can be in the range of 4 to 8 ms. The peak current ends after the time period T1 (at point B) and is then ramped down (1924) relative slowly for a second predetermined time period T2. The time period T2 can be in the range of 10 to 35 ms, and in some exemplary embodiments the time period T2 is in the range of 15 to 25 ms. After the expiration of the time period the current is at level C, which is in the range of 150 to 250 amps, and in another embodiment is in the range of 175 to 225 amps. In other exemplary embodiments, the current level at the point C is in the range of 55 to 75% of the peak current level 1923. In other exemplary embodiments, the current level at C is in the range of 60 to 70% of the level at peak 1923. It is noted that in other embodiments, the controller can use a predetermined time period for the duration to point C that begins at 1923, such that essentially two timers are going at the same time, where one is for the first time period to time T1, and the other goes from point 1923 to point C. That is, in some exemplary embodiments, a new time period need not be started at point B to count from B to C. Such systems and counters/timers are known and need not be described herein.

After point C, at the end of the period T2, the current is dropped to a low current level 1925, or shut off to ensure that the end of the consumable makes contact with the puddle at a relatively consistent frequency. For example, in exemplary embodiments, the current level is dropped to be in the range of 0 to 50 amps. In other exemplary embodiments, the current level is reduced to be in the range of 20 to 40 amps. This low current level promotes contact between the consumable and the puddle to create a short. With the above current waveform a large droplet is formed with a high level of heat to allow for improved performance in high wire feed speed welding operations. Also, the above process provides for improved penetration in a short circuit transfer type welding operation.

In exemplary embodiments of the above invention, each of the times T1 and T2, and the various discussed current levels can be selected by the power supply controller based on user input information, including (but not limited to) wire feed speed, consumable size, consumable type, desired power/energy input, as well as other possible factors. The controller can use a state table, look up table, etc. to determine each of the parameters for the waveform based on user input data. Further, in some embodiments the wire reversal discussed above with regarding to FIG. 18 can be implemented with embodiments of the waveform shown in FIG. 19.

It is noted that the welding system and circuitry as disclosed and discussed herein can implement any of the waveforms, and embodiments thereof, discussed herein.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A welding system, comprising:
    a welding power converter configured to receive an input power and output a welding current, in accordance with a welding waveform, to a welding electrode for a welding operation on a workpiece;
    a short circuit detection circuit which detects short circuit events between said electrode and said workpiece and detects short clearing events between said electrode and said workpiece; and
    a variable polarity circuit which changes a polarity of the welding current during said welding operation in accordance with the welding waveform,
    wherein, within a pulse period of said welding current, the welding current comprises:
    a background portion having a background current level and being at a first polarity,
    a short circuit clearing portion which is initiated when said short circuit detection circuit detects a short circuit event of said short circuit events, with said short circuit clearing portion being at a second polarity,
    a current pulse having a peak current level and being at the first polarity, where said current pulse occurs after said short circuit clearing portion, and
    a tailout portion being at said first polarity and which occurs after said current pulse.

2. The welding system of claim 1, wherein said short circuit clearing portion comprises:
    a droplet engagement portion having an engagement current level and being at said second polarity, where said engagement current level is maintained for a first duration, and where said droplet engagement portion occurs after said short circuit event is detected;
    a first ramp rate portion having a first current ramp rate and being at said second polarity; and
    a second ramp rate portion having a second current ramp rate and a second peak current level and being at said second polarity, wherein said second current ramp rate is less than said first current ramp rate and said second ramp rate portion occurs after said first ramp rate portion.

3. The welding system of claim 2, wherein said engagement current level is in a range of 35 to 75 amps.

4. The welding system of claim 2, wherein said first duration is in a range of 0.3 to 2 ms.

5. The welding system of claim 2, wherein said first duration is in a range of 0.5 to 1 ms.

6. The welding system of claim 2, wherein said first duration is a predetermined duration determined by at least one input parameter for said welding operation.

7. The welding system of claim 2, wherein said second peak current level being at said second polarity is in a range of 200 to 600 amps.

8. The welding system of claim 2, wherein a transition point between said first ramp rate portion and said second ramp rate portion is at a current level which is in a range of 50 to 150% of said peak current level at said first polarity.

9. The welding system of claim 2, wherein said peak current level at said first polarity is less than said second peak current level at said second polarity.

10. The welding system of claim 2, wherein a voltage of said welding operation reaches a voltage peak level during a transition from said second peak current level at said second polarity to said peak current level at said first polarity and wherein said voltage peak level is in a range of 60 to 90 volts.

* * * * *